(12) United States Patent
Sugihara et al.

(10) Patent No.: US 8,426,542 B2
(45) Date of Patent: Apr. 23, 2013

(54) OXIDANT AND DOPANT SOLUTION FOR CONDUCTIVE POLYMER PRODUCTION, A CONDUCTIVE POLYMER AND A SOLID ELECTROLYTE CAPACITOR

(75) Inventors: Ryosuke Sugihara, Izumiootsu (JP); Yuhei Tsurumoto, Suita (JP)

(73) Assignee: Tayca Corporation, Osaka-shi (JP)

( * ) Notice: Subject to any disclaimer, the term of this patent is extended or adjusted under 35 U.S.C. 154(b) by 12 days.

(21) Appl. No.: 13/394,407

(22) PCT Filed: Dec. 9, 2010

(86) PCT No.: PCT/JP2010/072097
§ 371 (c)(1), (2), (4) Date: Mar. 6, 2012

(87) PCT Pub. No.: WO2012/023221
PCT Pub. Date: Feb. 23, 2012

(65) Prior Publication Data
US 2012/0165488 A1   Jun. 28, 2012

(30) Foreign Application Priority Data
Aug. 19, 2010   (JP) ................ 2010-183682

(51) Int. Cl.
*C08G 75/00* (2006.01)
*C09K 3/00* (2006.01)

(52) U.S. Cl.
USPC ............. 526/256; 252/62.2; 252/182.17; 252/186.1

(58) Field of Classification Search ......... 526/256; 252/186.1
See application file for complete search history.

(56) References Cited

U.S. PATENT DOCUMENTS
6,519,137 B1 *   2/2003   Nitta et al. ............. 361/525
2010/0085686 A1   4/2010   Sugihara et al.

FOREIGN PATENT DOCUMENTS

| | | |
|---|---|---|
| JP | 2001-176758 A | 6/2001 |
| JP | 2002-60736 A | 2/2002 |
| JP | 2002-138137 A | 5/2002 |
| JP | 2003-160647 A | 6/2003 |
| JP | 2004-107552 A | 4/2004 |
| JP | 2004-265927 A | 9/2004 |
| JP | 2006-249128 A | 9/2006 |
| JP | 2006-265297 A | 10/2006 |
| JP | 2007-23090 A | 2/2007 |
| JP | 2008-172277 A | 7/2008 |
| WO | 2009/001707 A1 | 12/2008 |

OTHER PUBLICATIONS

International Search Report of PCT/JP2010/072097, mailing date of Mar. 15, 2011.

* cited by examiner

*Primary Examiner* — Ling Choi
*Assistant Examiner* — Chun-Cheng Wang
(74) *Attorney, Agent, or Firm* — Westerman, Hattori, Daniels & Adrian, LLP

(57) ABSTRACT

There is provided an oxidant and dopant which can produce a conductive polymer. The conductive polymer can be used in a solid electrolyte capacitor as solid electrolyte. The solid electrolyte capacitor can be provided with improved breakdown voltage and voltage resistance, as well as less generation of the defects due to leak current. There is provided an oxidant and dopant solution for conductive polymer production including an oxidant and dopant for an organic ferric sulfonate, and an alcohol with a carbon number of 1 to 4. The oxidant and dopant solution further includes a compound with a glycidyl group, or its ring-opened compound. Faborably, a polyalcohol is further added. Using the oxidant and dopant solution, a thiophene or its derivative is subject to an oxidation polymerization to prepare a conductive polymer, which can be used as solid electrolyte of a solid electrolyte capacitor.

16 Claims, No Drawings

US 8,426,542 B2

OXIDANT AND DOPANT SOLUTION FOR CONDUCTIVE POLYMER PRODUCTION, A CONDUCTIVE POLYMER AND A SOLID ELECTROLYTE CAPACITOR

FIELD OF TECHNOLOGY

The present invention relates to an oxidant and dopant solution for conductive polymer production, a conductive polymer produced by the oxidation polymerization of a thiophene or its derivative by using the solution, a solid electrolyte capacitor using the conductive polymer as solid electrolyte, and production method thereof.

BACKGROUND TECHNOLOGY

A conductive polymer has such a high electric conductivity that it has been used as solid electrolyte of a solid electrolyte capacitor such as aluminum solid electrolyte capacitor, tantalum solid electrolyte capacitor and niobium solid electrolyte capacitor.

The conductive polymer in such an application can be often made from a thiophene or its derivative by means of the oxidation polymerization (i.e., chemical oxidation polymerization) because of providing high utility products having balanced their electric conductivity and heat resistance. See Patent Publications Nos. 1 and 2.

In carrying out the oxidation polymerization of the thiophene or its derivative, a dopant of an organic sulfonic acid is used. The oxidant can be a transition metal, and in particular, a ferric salt compound is said to be favorable. Usually, a ferric salt of an organic sulfonic acid can be used as an oxidant and dopant agent to carry out a chemical oxidation polymerization of a thiophene or its derivative.

In the production of solid electrolyte capacitors using the conductive polymers as solid electrolyte, for example, a capacitor element is immersed in a monomer solution and taken out therefrom, and then, the capacitor element is immersed in an oxidant and dopant solution and taken out therefrom to polymerize. Alternatively, a capacitor element is immersed in an oxidant and dopant solution and taken out therefrom, and then, the capacitor element is immersed in a monomer solution, and taken out therefrom to polymerize. Alternatively, an oxidant and dopant solution is mixed with a monomer solution, into which a capacitor element is immersed, and then, taken out therefrom to polymerize.

In the production of the solid electrolyte capacitor, however, when p-tolueneferric sulfonate, as it used to be, is added as an oxidant and dopant agent to carry out the oxidation polymerization of the thiophene or its derivative, even though solid electrolyte capacitors can be produced with a low ESR (equivalent series resistance) and a high capacitance, they have lowered the voltage resistance (breakdown voltage). Therefore, it is reported that such an oxidant and dopant agent is inappropriate in the production of solid electrolyte capacitors in high voltage application. See patent Publication No. 3.

PRIOR ART REFERENCES

Patent Publications

Patent Publication 1: Japanese Laid-open Patent Publication No. 2003-160647; Patent Publication 2: Japanese Laid-open Patent Publication No. 2004-265927; and Patent Publication 3: Japanese Laid-open Patent Publication No. 2008-172277.

SUMMARY OF INVENTION

Objectives to Solve by the Invention

In view of the above, the objective of the present invention is to provide an oxidant and dopant solution useful in the conductive polymer production, in which the produced conductive polymer can be used in solid electrolyte capacitors as solid electrolyte, exhibiting a low ESR, a high capacitance and a high voltage resistance. The objective of the present application is also to provide a conductive polymer and a solid electrolyte capacitor by using the oxidant and dopant solution.

Means to Solve the Objectives

The objectives as discussed above have been accomplished by adding a glycidyl-group-containing compound or its ring-opened compound into an oxidant and dopant solution for conductive polymer production.

In details, the present invention provides an oxidant and dopant for conductive polymer production, including an organic ferric sulfonate (organic sulfonic acid ferric salt) and an alcohol with a carbon number of 1 to 4 are included, further including a glycidyl-group-containing compound or its ring-opened compound.

The present invention also provides an oxidant and dopant for conductive polymer production, in which a polyalcohol is further added along with the glycidyl-group-containing compound or its ring-opened compound.

The present invention also provides a conductive polymer, in which the oxidant and dopant solution for conductive polymer production is used to carry out the oxidation polymerization of a thiophene or its derivative. Further, the present invention provides a solid electrolyte capacitor using the conductive polymer as solid electrolyte, in which the conductive polymer is produced by means of the oxidation polymerization of a thiophene or its derivative with the oxidant and dopant solution for conductive polymer production.

EFFECTS OF THE INVENTION

According to the present invention, the oxidant and dopant solution for conductive polymer production, which is hereinafter simply called as "oxidant and dopant solution," has included a compound with 1 to 4 glycidyl groups, or its ring-opened compound. Using the oxidant and dopant to carry out the oxidation polymerization of a thiophene or its derivative, a conductive polymer can be produced which is then used as solid electrolyte of a solid electrolyte capacitor. It was found that the ESR of the solid electrolyte capacitor can be low (or small) and the capacitance can be large (or high) while the voltage resistance can be high. Also, when the oxidant and dopant solution of the present invention is used to carry out the oxidation polymerization of the thiophene or its derivative to produce a conductive polymer and to use it in a solid electrolyte capacitor as solid electrolyte, it is less likely that the solid electrolyte capacitor causes defects due to the leak current.

EMBODIMENTS TO CARRY OUT THE INVENTION

In the present invention, the organic sulfonic acid, of the organic ferric sulfonate in the oxidant and dopant solution, can favorably include: for example, aromatic sulfonic acid such as benzenesulfonic acid or its derivative, naphthalenesulfonic acid or its derivative, anthraquinonesulfonic acid or its derivative; and polymeric sulfonic acid such as polystyrene sulfonic acid, sulfonated polyester, and phenol sulfonic acid novolak resin.

The benzenesulfonic acid derivative can include, for example, toluenesulfonic acid, ethylbenzenesulfonic acid, propylbenzenesulfonic acid, butylbenzenesulfonic acid, dodecylbenzenesulfonic acid, methoxybenzenesulfonic acid, ethoxybenzenesulfonic acid, propoxybenzenesulfonic acid, butoxybenzenesulfonic acid, phenolsulfonic acid, cresolsulfonic acid, and benzenedisulfonic acid. The naphthalenesulfonic acid derivative can include, for example, naphthalenedisulfonic acid, naphthalenetrisulfonic acid, methylnaphthalenesulfonic acid, ethylnaphthalenesulfonic acid, propylnaphthalenesulfonic acid, and butylnaphthalenesulfonic acid. The anthraquinonesulfonic acid derivative can include, for example, anthraquinonedisulfonic acid, and anthraquinonetrisulfonic acid. In particular, toluenesulfonic acid, methoxybenzenesulfonic acid, phenolsulfonic acid, naphthalenesulfonic acid, and naphthalenetrisulfonic acid can be favorably used. More in particular, p-toluenesulfonic acid and methoxybenzenesulfonic acid can be favorably used. Most in particular, p-toluenesulfonic acid can be favorably used.

The organic ferric sulfonate can favorably include the organic sulfonic acid in a molar ratio (iron vs. organic sulfonic acid) of 1:3, or less. When the molar ratio of iron vs. organic sulfonic acid is lower than the stoichiometri molar ratio, 1:3, then the reaction speed of the organic ferric sulfonate can be slightly reduced. The molar ratio of iron vs. organic sulfonic acid can be from 1:3, to about 1:2, and in particular to about 1:2.2, and yet in particular to about 1:2.4, and further yet in particular to about 1:2.75.

The alcohol with a carbon number of 1 to 4 is used to prepare a solution dissolving the organic ferric sulfonate to serve as oxidant and dopant. Such an alcohol can be methanol (methyl alcohol), ethanol (ethyl alcohol), propanol (propyl alcohol), and butanol (butyl alcohol). Propanol or butanol can be linier or branched.

The glycidyl-group-containing compound can favorably include, for example, a monoglycidyl compound represented by Formula (1), a diglycidyl compound represented by Formula (2), a diglycidyl compound represented by Formula (3), glycerol triglycidyl ether, diglycerol tetraglycidyl ether, glycidyl methacrylate, phenyl glycidyl ether, cresyl glycidyl ether, cyclohexanedimethanol diglycidyl ether, resorcinol diglycidyl ether, trimethylolpropane triglycidyl ether, alcohol-soluble epoxy resin and alcohol-soluble polyglycerol polyglycidyl ether, and a ring-opened compound thereof.

Formula (1) is:

(1)

in which the formula, R1 is hydroxyl group, an alkyl group with a carbon number of 1 to 5, or an alkoxyl group with a carbon number of 1 to 7.

Formula (2) is:

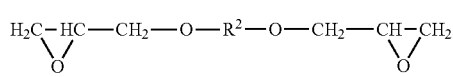

(2)

in which the formula, R2 is an alkylene with a carbon number of 2 to 6.

Formula (3) is:

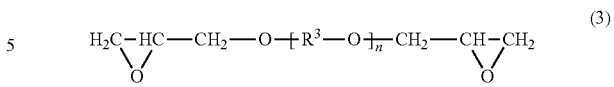

(3)

in which the formula, R3 is an alkylene with a carbon number of 2 to 4, and n is 2 to 20.

The glycerol triglycidyl ether is represented by Formula (4). Formula (4) is:

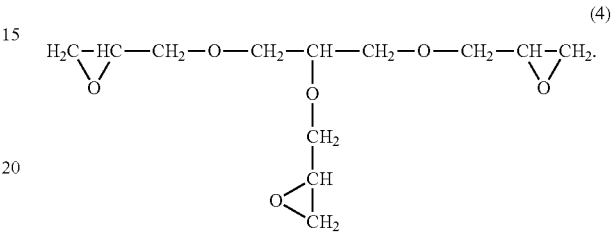

(4)

The diglycerol tetraglycidyl ether is represented by Formula (5). Formula (5) is:

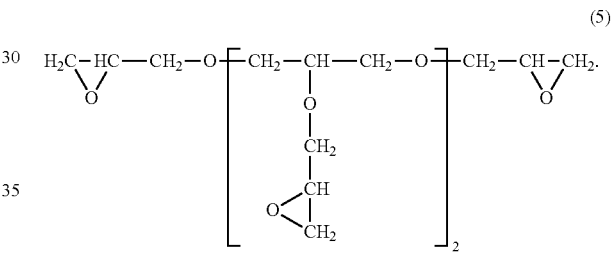

(5)

As discussed above, the glycidyl-group-containing compound can be the monoglycidyl compound represented by Formula (1), the diglycidyl compound represented by Formula (2), the diglycidyl compound represented by Formula (3), glycerol triglycidyl ether, diglycerol tetraglycidyl ether, glycidyl methacrylate, phenyl glycidyl ether, cresyl glycidyl ether, cyclohexanedimethanol diglycidyl ether, resorcinol diglycidyl ether, and trimethylolpropane triglycidyl ether. The ring-opened compound of the glycidyl-group-containing compound is a glycol, which can be formed in such a way that the glycidyl group is ring-opened as shown in Formula (6).

Formula (6):

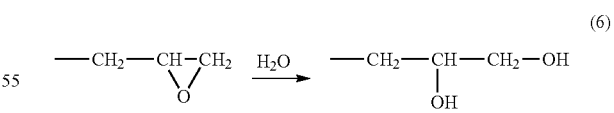

(6)

The monoglycidyl compound represented by Formula (1), the diglycidyl compound represented by Formula (2), the diglycidyl compound represented by Formula (3), glycerol triglycidyl ether, diglycerol tetraglycidyl ether, glycidyl methacrylate, phenyl glycidyl ether, cresyl glycidyl ether, cyclohexanedimethanol diglycidyl ether, resorcinol diglycidyl ether, and trimethylolpropane triglycidyl ether are categorized in ones in which 1 to 4 glycidyl groups are included. In the present invention, such a compound having 1 to 4 glycidyl groups or its ring-opened compound can be favorably used. In addition to the compound having 1 to 4 glycidyl groups or its ring-opened compound, an alcohol-soluble epoxy resin or its ring-opened compound, and an alcohol-soluble polyglycerol polyglycidyl ether or its ring-opened compound can be used. The alcohol-soluble epoxy resin can include, for example, a commercial product, "WATERSOL BC-3010" manufactured by DIC Corporation. The alcohol-soluble polyglycerol polyglycidyl ether can include, for example, a commercial product, SR-4GLS, manufactured by Sakamoto Yakuhin Kogyo co., Ltd. The ring-opened compound of these alcohol-soluble epoxy resin and alcohol-soluble polyglycerol polyglycidyl ether can a glycol, in which the glycidyl group is ring-opened, as shown in Formula (6).

When using a glycidyl compound with two or more glycidyl groups, the ring-opened compound of the glycidyl-group-containing compound does not have to include all of the glycidyl groups ring-opened. A compound having a part of the glycidyl groups ring-opened can be used.

The monoglycidyl compound or its ring-opened compound as shown in Formula (1) can include, for example, epoxy propanol (i.e., glycidyl), methyl glycidyl ether, ethyl glycidyl ether, propyl glycidyl ether, butyl glycidyl ether, epoxy butane (i.e., glycidyl methane), epoxy pentane (i.e., glycidyl ethane), epoxy hexane (i.e., glycidyl propane), epoxy heptane (i.e., glycidyl butane), epoxy octane (i.e., glycidyl pentane), and epoxy cyclohexene. In particular, epoxy propanol, butyl glycidyl ether, and epoxy butane can be favorably used. The monoglycidyl compound as shown in Formula (1) is a compound with one glycidyl group. The monoglycidyl compound as shown in Formula (1) is different from glycidyl methacrylate, phenyl glycidyl ether, or cresyl glycidyl ether. Nonetheless, each of these compounds has one glycidyl group like the monoglycidyl compound shown in Formula (1). In the present invention, glycidyl methacrylate, phenyl glycidyl ether, cresyl glycidyl ether can be favorably used.

The diglycidyl compound as shown in Formula (2) can include, for example, ethylene glycol diglycidyl ether, propylene glycol diglycidyl ether, butylene glycol diglycidyl ether, pentylene glycol diglycidyl ether, hexylene glycol diglycidyl ether, and glycerol diglycidyl ether. In particular, ethylene glycol diglycidyl ether, propylene glycol diglycidyl ether, butylene glycol diglycidyl ether, and hexylene glycol diglycidyl ether can be favorably used. The diglycidyl compound as shown in Formula (2) has two glycidyl groups, so that it does not include cyclohexane dimethanol diglycidyl ether, resorcinol glycidyl ether, and etc. These compounds are not included in the diglycidyl compound as shown in Formula (2), but each of these compounds has two glycidyl groups.

The diglycidyl compound as shown in Formula (3) can include, for example, diethylene glycol diglycidyl ether, dipropylene glycol diglycidyl ether, triethylene glycol diglycidyl ether, tripropylene glycol diglycidyl ether, polyethylene glycol diglycidyl ether, polypropylene glycol diglycidyl ether, and polytetramethylene glycol diglycidyl ether. In particular, polyethylene glycol diglycidyl ether and polytetramethylene glycol diglycidyl ether can be favorably used.

The glycidyl-group-containing compound or its ring-opened compound can be used alone or in combination of two or more.

The glycidyl-group-containing compound or its ring-opened compound can be one with a high boiling temperature (for example, ethylene glycol diglycidyl ether has a boiling temperature of 112° C./0.6 kPa). Such a compound cannot be removed by normal drying process, and can remain in the conductive polymer. However, even if it remains, it was found that it does not increase the ESR, or decrease the capacitance and voltage resistance, as shown in the Examples later.

The glycidyl-group-containing compound or its ring-opened compound can be added in an amount of, with respect to the organic ferric sulfonate, 2 to 40% by mass standard (i.e., with respect to 100 parts by mass of the organic ferric sulfonate, 2 to 40 parts by mass of the glycidyl-group-containing compound or its ring-opened compound can be added). When the amount of the glycidyl-group-containing compound or its ring-opened compound is less than the range above, it is uncertain if it brings the effects of reducing the leak current or increasing the voltage resistance. When the amount of the glycidyl-group-containing compound or its ring-opened compound is more than the range above, it trades off the advantageous effects against the cost increase, and furthermore, it may adversely affect the mixing, and decrease the storage stability of the oxidant and dopant solution. Among the range above, the amount by mass standard of the glycidyl-group-containing compound or its ring-opened compound, with respect to the organic ferric sulfonate, can be favorably included at a amount of 5% or more, and in particular, 10% or more, but 36% or less. In particular, in order to assuredly improve the voltage resistance, the amount by mass standard of the glycidyl-group-containing compound or its ring-opened compound, with respect to the organic ferric sulfonate, can be 10 to 40% (i.e., with respect to 100 parts by mass of the organic ferric sulfonate, 10 to 40 parts by mass of the glycidyl-group-containing compound or its ring-opened compound can be added). Furthermore, the amount can be favorably 14% or more, but 36% or less.

When the oxidant and dopant solution including the glycidyl-group-containing compound or its ring-opened compound further includes the polyalcohol, it can be expected to improve the voltage resistance and reduce the ESR, more than the embodiment including the glycidyl-group-containing compound alone.

The polyalcohol favorably used can include an aliphatic hydrocarbon of 2 to 10 carbon numbers with 2 to 3 hydroxy groups. The examples of the polyalcohol can include ethylene glycol, propanediol, butanediol, pentanediol, hexanediol, heptanediol, octanediol, nonanediol, decanediol, and glycerol. In particular, glycerol, ethylene glycol, propanediol, and butanediol can be favorably used.

The more effects by the polyalcohol can be expected as the amount added is increased, even at a small amount. However, in order to clearly expect the effects, the amounts of the polyalcohol by mass standard can be, with respect to the organic ferric sulfonate, 4% or more (i.e., the polyalcohol is added at an amount of 4 parts or more by mass with respect to 100 parts by mass of the organic ferric sulfonate). As the amount of the polyalcohol is increased, the viscosity of the oxidant and dopant solution is increased. Therefore, the amount of the polyalcohol can be 20% or less by mass standard with respect to the organic ferric sulfonate.

The order to add the glycidyl-group-containing compound or its ring-opened compound, and the polyalcohol, is not restricted; both can be added concurrently, or one can be added before the other. Further, a reaction product of the glycidyl-group-containing compound or its ring-opened compound with the polyalcohol can be added.

The concentration of the organic ferric sulfonate of the oxidant and dopant solution for conductive polymer production depends on the kind of the alcohol to make a solution. Generally, it is fabrable when it is high, and in particular, it can be in the range from 25 to 60 mass %, or further in particular, from 30 to 60 mass %.

In the present invention, the monomer for producing the conductive polymer can be a thiophene or its derivative. As described before, the conductive polymer obtained by polymerizing the thiophene or its derivative exhibits a good balance in the electric conductivity and the heat resistance. As results, such solid electrolyte capacitors are more excellent in capacitor properties than those using polymers from other monomers.

The thiophene derivative can include, for example, 3,4-ethylenedioxythiophene, 3-alkylthiophene, 3-alkoxythiophene, 3-alkyl-4-alkoxythiophene, 3,4-alkylthiophene, and 3,4-alkoxythiophene, as well as an alkylated ethylenedioxythiophene in which 3,4-ethylenedioxythiophene is modified with an alkyl group substituent, where the carbon number of the alkyl group and the alkoxy group can be 1 to 16, and in particular, 1 to 4.

Here is more in detailed description for the alkylated ethylenedioxythiophene in which 3,4-ethylenedioxythiophene is modified with an alkyl group substituent. 3,4-ethylenedioxythiophene and the alkylated ethylenedioxythiophene are compounds represented by Formula (7).

Formula 7:

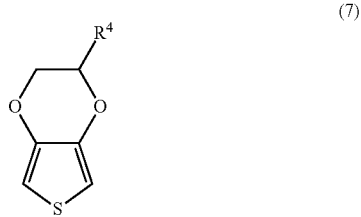

(7)

in which the formula, R4 is hydrogen or alkyl group.

In Formula (7), a compound when R4 is hydrogen is 3,4-ethylenedioxythiophene. Under the IUPAC naming, it is referred to as 2,3-dihydro-thieno[3,4-b][1,4]dioxine. This compound is often expressed by its general name, 3,4-ethylenedioxythiophene, rather than the IUPAC name, so that this specification uses the term "3,4-ethylenedioxythiophene" for "2,3-dihydro-thieno[3,4-b][1,4]dioxine." In Formula (7), when R4 is an alkyl group, favorable alkyl group can be one with a carbon number of 1 to 4, i.e., methyl group, ethyl group, propyl group, or butyl group. The example of the compound when R4 is methyl group is, under the IUPAC naming, "2-methyl-2,3-dihydro-thieno[3,4-b][1,4]dioxine." In this specification, it is simply referred to as "methylated ethylenedioxythiophene." A compound when in Formula (7), R4 is ethyl group is, under the IUPAC naming, "2-ethyl-2,3-dihydro-thieno[3,4-b][1,4]dioxine." In this specification, it is simply called as "ethylated ethylenedioxythiophene."

A compound when in Formula (7), R4 is propyl group is, under the IUPAC naming, "2-propyl-2,3-dihydro-thieno[3,4-b][1,4]dioxine." In this specification, it is simply called as "propylated ethylenedioxythiophene." A compound when in Formula (7) R4 is butyl group is, under the IUPAC naming, "2-butyl-2,3-dihydro-thieno[3,4-b][1,4]dioxine." In this specification, it is simply called as "butylated ethylenedioxythiophene." "2-alkyl-2,3-dihydro-thieno[3,4-b][1,4]dioxine" is, in this specification, simply called as "alkylated ethylenedioxythiophene." Among the alkylated ethylenedioxythiophenes, it is favorabe to use methylated ethylenedioxythiophene, ethylated ethylenedioxythiophene, propylated ethylenedioxythiophene, and butylated ethylenedioxythiophene. In particular, it is favorable to use ethylated ethylenedioxythiophene, propylated ethylenedioxythiophene.

It is favorable to use a mixture of 3,4-ethylenedioxythiophene (i.e., 2,3-dihydro-thieno[3,4-b][1,4]dioxine) with an alkylated ethylenedioxythiophene (i.e., 2-alkyl-2,3-dihydro-thieno[3,4-b][1,4]dioxine). The mixing ratio can be from 0.1:1 to 1:0.1, and in particular, from 0.2:1 to 1:0.2, and yet in particular, from 0.3:1 to 1:0.3.

In the production of the conductive polymer by using the oxidant and dopant solution, the present invention can apply to either when the conductive polymer is normally produced, or so-called "polymerization on the spot," i.e., when the conductive polymer is produced during the production of the solid electrolyte capacitor.

The monomer, i.e., thiophene or its derivative, is liquid at ambient temperature so that it can be provided for the polymerization as it is. In order to smoothly proceed with the polymerization reaction, the monomer can be diluted by an organic solvent such as methanol, ethanol, propanol, butanol, acetone, and acetonitrile.

Generally, when producing a conductive polymer (note the phrase "when producing a conductive polymer" means the case excluding the production of a conductive polymer as the "polymerization on the spot" during the production of a solid electrolyte capacitor), a mixture is used, which is made by mixing the oxidant and dopant solution of the present invention with a monomer, i.e., thiophene or its derivative (note that the mixture ratio of the oxidant and dopant vs. the monomer is favorably 5:1 to 15:1 by mass standard). For example, the oxidation polymerization can be carried out at 5 to 95° C. for 1 to 72 hours.

In particular, the oxidant and dopant solution of the present invention was developed to appropriately produce a conductive polymer from a monomer, i.e., thiophene or its derivative, through the "polymerization on the spot" during the production of a solid electrolyte capacitor. The details are hereinafter described.

As the solid electrolyte capacitor, there are an aluminum solid electrolyte capacitor, a tantalum solid electrolyte capacitor, a niobium solid electrolyte capacitor, and etc. As the aluminum solid electrolyte capacitor, there are a winding type aluminum solid electrolyte capacitor and a lamination type aluminum solid electrolyte capacitor. The oxidant and dopant solution of the present invention was developed, in particular, to appropriately produce a winding type aluminum solid electrolyte capacitor. Therefore, the details are described in this respect.

First, to provide a capacitor element of a winding type aluminum solid electrolyte capacitor, a surface of an aluminum foil is applied to an etching process, and then to a chemical conversion treatment to form a dielectric layer serving as a positive electrode, to which a lead terminal is attached. Also, another lead terminal is attached to a negative electrode of an aluminum foil. The positive and the negative electrodes with the lead terminals are wound via a separator.

For example, using the capacitor element, the winding type aluminum solid electrolyte capacitor can be produced as followed. The capacitor element is immersed in a mixture of the oxidant and dopant solution of the present invention and a monomer (i.e., thiophene or its derivative), and taken out therefrom to polymerize the monomer at room temperature or under heating. Thereby, a solid electrolyte layer of a conductive polymer is provided, which includes a polymer backbone of a polymer made from the thiophene or its derivative. Then, the capacitor element with the solid electrolyte layer is provided with an exterior package to become the winding type aluminum solid electrolyte capacitor.

Instead of immersing the capacitor element into the mixture of the oxidant and dopant solution of the present invention with the monomer, the invention can be carried out as follows: The monomer (i.e., thiophene or its derivative) can be diluted with an organic solvent such as methanol to provide a monomer solution, into which the capacitor element can be immersed. Then, it can be taken out therefrom for drying, and then, the capacitor element can be immersed in the oxidant and dopant solution of the present invention, and taken out therefrom to polymerize the monomer at room temperature or under heating. Alternatively, the capacitor element can be immersed in the oxidant and dopant solution of the present invention, and taken out therefrom. Then, the capacitor element can be immersed in the monomer and taken out therefrom to cause a polymerization reaction of the monomer at room temperature or under heating. The processes thereafter can be the same manner as described before. Thereby the winding type aluminum solid electrolyte capacitor can be produced.

Other than the winding type aluminum solid electrolyte capacitor, other solid electrolyte capacitors such as a lamination type aluminum solid electrolyte capacitor, tantalum solid electrolyte capacitor, and niobium solid electrolyte capacitor can be produced as follows. A positive electrode made of a porous valve metal such as aluminum, tantalum and niobium and a dielectric layer of an oxidation film of the valve metal are used. The capacitor element can be immersed in a mixture of the oxidant and dopant solution of the present invention and a monomer, and then taken out therefrom to polymerize the monomer (i.e., thiophene or its derivative) at room temperature or under heating, in the same manner as the production of the winding type aluminum solid electrolyte capacitor. Or, the capacitor element is immersed in a monomer solution and taken out therefrom for drying, and then, the capacitor element can be immersed in the oxidant and dopant solution of the present invention and taken out therefrom to cause a polymerization of the monomer at room temperature or under heating. Or, the capacitor element can be immersed in the oxidant and dopant solution of the present invention, and then taken out therefrom. Then, the capacitor element can be immersed in a monomer, and then taken out therefrom to polymerize the monomer at room temperature or under heating. Then, the capacitor element can be washed and dried. These processes can be repeated to form a solid electrolyte layer of a conductive polymer. Then, carbon paste and silver paste are provided, and dried. Then, an outside exterior package can be provided to produce the lamination type aluminum solid electrolyte capacitor, tantalum solid electrolyte capacitor, niobium solid electrolyte capacitor, and so on.

An explanation is described regarding the production of the conductive polymer, or regarding the production of the conductive polymer through the "polymerization on the spot" during the production of the solid electrolyte capacitor. The oxidant and dopant solution of the present invention, and a monomer (i.e., thiophene or its derivative) or its monomer solution can be used at a use ratio of the oxidant and dopant, i.e, organic ferric sulfonate, and the monomer of 2:1 to 8:1 by mass. The "polymerization on the spot" can be carries out e.g., at 10 to 300° C. for 1 to 180 minutes.

When the capacitor element is immersed in a mixture of the oxidant and dopant solution of the present invention and the monomer in producing the solid electrolyte capacitor, normally, the oxidant and dopant solution of the present invention can be prepared in advance, with which the monomer is mixed. Instead of the in-advance preparation, a mixture of an alcohol solution (alcohol solution with a carbon number of 1 to 4) of the organic ferric sulfonate, the glycidyl-group-containing compound or its ring-opened compound, the polyalcohol if necessary, and the monomer can be provided. In such a mixed condition, the oxidant and dopant solution of the present invention, i.e., the alcohol solution of the organic ferric sulfonate, the glycidyl-group-containing compound or its ring-opened compound, and if necessary, the polyalcohol can coexist.

EXAMPLES

Hereinafter, with reference to the Examples, the present invention is described in more detail. The present invention cannot be limited to the description of the Examples. In the Examples, "%" for the concentration and the amount is by mass standard, unless otherwise provided.

Oxidant and Dopant Solution Preparation (1)

Examples 1 to 30 and Comparative Examples 1 to 3

In Examples 1 to 30 and Comparative Examples 1 to 3, ferric p-toluenesulfonate was used as the organic ferric sulfonate serving as the oxidant and dopant. As the glycidyl-group-containing compound (which is hereinafter simply called as "glycidyl compound"), Examples 1 to 10 used a diglycidyl compound as shown in Formula (3), which was polyethylene glycol diglycidyl ether (SR-BEGS, a product name, manufactured by Sakamoto Yakuhin Kogyo co., Ltd.; "n" in Formula (3) was 8, that is, the median value of the polyethylene glycol diglycidyl ether). Examples 11, 12 and 13 used a diglycidyl compound of Formula (2), which was ethylene glycol diglycidyl ether, propylene glycol diglycidyl ether, and butylene glycol diglycidyl ether, respectively. Examples 14, 15, 16, 17 and 18 used a diglycidyl compound of Formula (3), which was, respectively, diethylene glycol diglycidyl ether, dipropylene glycol diglycidyl ether, triethylene glycol diglycidyl ether, tripropylene glycol diglycidyl ether, and polypropylene glycol diglycidyl ether (SR-4PG, a product name, manufactured by Sakamoto Yakuhin Kogyo co., Ltd.; "n" in Formula (3) was 7 as the median value of the polypropylene glycol diglycidyl ether). Example 19 used glycerol triglycidyl ether. Example 20 used diglycerol tetraglycidyl ether. Example 21 used a monoglycidyl compound of Formula (1), which was epoxy propanol. Examples 22 and 23 used a ring-opened compound of a monoglycidyl compound of Formula (1), which was epoxy butane, and epoxy octane, respectively. Example 24 used a monoglycidyl compound of Formula (1), which was butyl glycidyl ether. Examples 25 to 27 used a compound with one glycidyl group, which was glycidyl methacrylate, phenyl glycidyl ether, and cresyl glycidyl ether, respectively. Example 28 used a diglycidyl compound of Formula (2), which was hexylene glycol diglycidyl ether. Example 29 used a diglycidyl compound of Formula (3), which was polytetramethylene glycolglycidyl ether. Example 30 used a reaction product of Preparation Example 1 of glycidyl methacrylate and butanediol. As the polyalcohol, Examples 1 to 6, Example 8, Comparative Examples 2 to 3 used glycerol (glycerin). Example 9, Examples 11 to 20 and Examples 25 to 30 used butanediol. Example 10 and Examples 21 to 24 used hexanediol. As shown later, the oxidant and dopant solution was prepared. Note that the kinds, the amounts, and the addition ratio with respect to p-tolueneferric sulfonate, of the glycidyl compound, as well as the kinds, the amounts, the addition ratio with respect to p-tolueneferric sulfonate, of the polyalcohol are shown in Tables 1 and 2. However, for the convenience in showing in Tables 1 and 2, in case of the preparation method (1) of the oxidant and dopant solution, the kind of the glycidyl compound is shown as "X," the amount of the glycidyl compound is shown as "A(g)," the addition ratio with respect to ferric p-toluenesulfonate is shown as "B(%)," the kind of the polyalcohol is shown as "Y," the amount of the polyalcohol is shown as "C(g)," the addition ratio with respect to ferric p-toluenesulfonate is shown as "D(%)," the amount of butanol is shown as "E(g)." In the Examples, there is Example 7 in which only the diglycidyl compound was added without adding the polyalcohol. In Comparative Examples, there are ones in which neither of the diglycidyl compound nor the polyalcohol was added, or in which only the polyalcohol was added.

Preparation Example 1

Preparation of a Reaction Product of Glycidyl Methacrylate and Butanediol

Into a reaction vessel, glycidyl methacrylate (284.3 g; 2.00 moles), butanediol (90.1 g; 1.00 mole), and p-toluenesulfonic acid monohydrate (1.0 g) were added. The inside of the vessel was kept at 80° C., while stirred for 12 hours. The reaction liquid was cooled to room temperature. A product, i.e., a reaction product of glycidyl methacrylate and butanediol (375 g) was obtained. The reaction product of glycidyl methacrylate and butanediol is shown as "Preparation Example 1" in the Tables for the simplification purpose.

Oxidant and Dopant Solution: Preparation Method (1)

A ferric p-toluenesulfonate butanol solution (the molar ratio of iron and p-toluenesulfonic acid was 1:2.74) manufactured by Tayca Corporation, whose concentration was 40%, was distilled for condensation. The dry solid content was 67.2%. Into 100 g of the solution, glycidyl compound X (Ag), polyalcohol Y (Cg), and butanol (Eg) were added, and heated for one hour. Then, a glass filter GF75 manufactured by Advantec Toyo Kaisha Ltd. ("GF75" refers to a product number. Hereinafter, the manufacturer's name is omitted) was used for filtration. Each of the filtrates was an oxidant and dopant solution as Examples 1 to 30 and Comparative Examples 1 to 3, respectively. The solid content concentration of the solution, for the calculation purpose, was 43.0%. In Tables 1 and 2, as to the oxidant and dopant solution, the content ratio B % of glycidyl compound X with respect to p-tolueneferric sulfonate, and the content ratio D % of polyalcohol Y with respect to ferric p-toluenesulfonate are shown about each of the Examples and the Comparative Examples. In Tables 1 and 2, the glycidyl compound and the polyalcohol are shown by abbreviations. The oxidant and dopant solutions of Examples 1 to 30 and Comparative Examples 1 to 3, as well as the oxidant and dopant solutions of Examples 31 to 32 and Comparative Examples 4 to 6, as discussed later, were evaluated in Sections of Evaluations (1) to (8) of the solid electrolyte capacitor, as discussed later.

Glycidyl Compounds:
PEG-DG: polyethylene glycol diglycidyl ether
EG-DG: ethylene glycol diglycidyl ether
PG-DG: propylene glycol diglycidyl ether
BG-DG: butylene glycol diglycidyl ether
DEG-DG: diethylene glycol diglycidyl ether
DPG-DG: dipropylene glycol diglycidyl ether
TEG-DG: triethylene glycol diglycidyl ether
TPG-DG: tripropylene glycol diglycidyl ether
PPG-DG: polypropylene glycol diglycidyl ether
GL-TrG: glycerol triglycidyl ether
DGL-TtG: diglycerol tetraglycidyl ether
EPPOL: epoxy propanol
EPBTN: epoxy butane
EPOTN: epoxy octane
BU-GE: butyl glycidyl ether
Meth-G: glycidyl methacrylate
Ph-G: phenyl glycidyl ether
Cr-G: cresyl glycidyl ether
HexG-DG: hexylene glycol diglycidyl ether
PMG-DG: polytetramethylene glycol diglycidyl ether
Polyalcohols
GLYOL: glycerol
BUDOL: butanediol
HEDOL: hexanediol In Comparative Example 3, polyethylene glycol 400, simply called as "PEG 400," was used instead of the glycidyl compound.

TABLE 1

| | glycidyl compound | | polyalcohol | | amount of butanol |
| | X | amount | Y | amount | |
| | | A(g) | B(%) | | C(g) | D(%) | E(g) |
| --- | --- | --- | --- | --- | --- | --- | --- |
| Ex. 1 | PEG-DG | 6.7 | 10 | GLYOL | 6.7 | 10 | 42.9 |
| Ex. 2 | PEG-DG | 10.8 | 16 | GLYOL | 6.7 | 10 | 38.8 |
| Ex. 3 | PEG-DG | 14.8 | 22 | GLYOL | 6.7 | 10 | 34.8 |
| Ex. 4 | PEG-DG | 18.8 | 28 | GLYOL | 6.7 | 10 | 30.8 |
| Ex. 5 | PEG-DG | 22.8 | 34 | GLYOL | 6.7 | 10 | 26.8 |
| Ex. 6 | PEG-DG | 28.2 | 40 | GLYOL | 6.7 | 10 | 21.4 |
| Ex. 7 | PEG-DG | 18.8 | 28 | — | 0 | 0 | 37.5 |
| Ex. 8 | PEG-DG | 18.8 | 28 | GLYOL | 13.4 | 20 | 24.1 |
| Ex. 9 | PEG-DG | 18.8 | 28 | BUDOL | 6.7 | 10 | 30.8 |
| Ex. 10 | PEG-DG | 18.8 | 28 | HEDOL | 6.7 | 10 | 30.8 |
| Ex. 11 | EG-DG | 18.8 | 28 | BUDOL | 6.7 | 10 | 30.8 |
| Ex. 12 | PG-DG | 18.8 | 28 | BUDOL | 6.7 | 10 | 30.8 |
| Ex. 13 | BG-DG | 18.8 | 28 | BUDOL | 6.7 | 10 | 30.8 |
| Ex. 14 | DEG-DG | 18.8 | 28 | BUDOL | 6.7 | 10 | 30.8 |
| Ex. 15 | DPG-DG | 18.8 | 28 | BUDOL | 6.7 | 10 | 30.8 |
| Ex. 16 | TEG-DG | 18.8 | 28 | BUDOL | 6.7 | 10 | 30.8 |
| Ex. 17 | TPG-DG | 18.8 | 28 | BUDOL | 6.7 | 10 | 30.8 |

TABLE 2

| | glycidyl compound | | polyalcohol | | amount of butanol |
| | X | amount | Y | amount | |
| | | A(g) | B(%) | | C(g) | D(%) | E(g) |
| --- | --- | --- | --- | --- | --- | --- | --- |
| Ex. 18 | PPG-DG | 18.8 | 28 | BUDOL | 6.7 | 10 | 30.8 |
| Ex. 19 | GL-TrG | 18.8 | 28 | BUDOL | 6.7 | 10 | 30.8 |
| Ex. 20 | DGL-TtG | 18.8 | 28 | BUDOL | 6.7 | 10 | 30.8 |
| Ex. 21 | EPPOL | 18.8 | 28 | HEDOL | 6.7 | 10 | 30.8 |
| Ex. 22 | EPBTN | 18.8 | 28 | HEDOL | 6.7 | 10 | 30.8 |
| Ex. 23 | EPOTN | 18.8 | 28 | HEDOL | 6.7 | 10 | 30.8 |
| Ex. 24 | BU-GE | 18.8 | 28 | HEDOL | 6.7 | 10 | 30.8 |
| Ex. 25 | Meth-G | 18.8 | 28 | BUDOL | 6.7 | 10 | 30.8 |
| Ex. 26 | Ph-G | 18.8 | 28 | BUDOL | 6.7 | 10 | 30.8 |
| Ex. 27 | Cr-G | 18.8 | 28 | BUDOL | 6.7 | 10 | 30.8 |
| Ex. 28 | HexG-DG | 18.8 | 28 | BUDOL | 6.7 | 10 | 30.8 |
| Ex. 29 | PGM-DG | 18.8 | 28 | BUDOL | 6.7 | 10 | 30.8 |
| Ex. 30 | Preparation Ex. 1 | 18.8 | 28 | — | 0 | 0 | 37.5 |
| Comp. Ex. 1 | — | 0 | 0 | — | 0 | 0 | 56.3 |
| Comp. Ex. 2 | — | 0 | 0 | GLYOL | 6.7 | 10 | 49.6 |
| Comp. Ex. 3 | PEG 400 | 18.8 | 28 | GLYOL | 6.7 | 10 | 30.8 |

Oxidant and Dopant Solution; Preparation (2)

Examples 31 to 32 and Comparative Examples 4 to 6

In Examples 31 to 32 and Comparative Examples 4 to 6, the organic ferric sulfonate was ferric methoxybenzenesulfonate. In Example 31, the glycidyl compound was polyethylene glycol diglycidyl ether (which was the same as one used in Example 1), which is a diglycidyl compound of Formula (3). In Example 32, the glycidyl compound was epoxy propanol, which is a monoglycidyl compound of Formula (1). As the polyalcohol, glycerol was used in Examples 31 and 32 and Comparative Examples 5 to 6, to prepare an oxidant and dopant solution as follows. Note that in preparation of an oxidant and dopant solution using ferric methoxybenzenesulfonate as the oxidant and dopant, the kind and the amount of the glycidyl compound, and the content ratio of the glycidyl compound with respect to ferric methoxybenzenesulfonate, the kind and the amount of the polyalcohol, and the content ratio of the polyalcohol with respect to ferric methoxybenzenesulfonate are shown in Table 3. In the Section of "Oxidant And Dopant Solution; Preparation Method (2)," the kind of the glycidyl compound is referred to as "X," the amount of the glycidyl compound is referred to as "A(g)," the content ratio of the glycidyl compound with respect to ferric methoxybenzenesulfonate is referred to as "B(%)," the kind of the polyalcohol is referred to as "Y," the amount of the polyalcohol is referred to as "C(g)," the content ratio thereof with respect to ferric methoxybenzenesulfonateis referred to as "D(%)," the amount of ethanol is referred to as "E(g)."

Oxidant and Dopant Solution; Preparation Method (2)

A ferric methoxybenzenesulfonate ethanol solution (the molar ratio of iron and methoxy benzene sulfonic acid was 1:2.72) manufactured by Tayca Corporation, whose concentration was 40%, was distilled for condensation. The dry solid content was 64.5%. Into 100 g of the solution, glycidyl compound X (Ag), polyalcohol Y (Cg), and ethanol (Eg) were added and heated at 60° C. for one hour. Then, a glass filter GF75 manufactured by Advantec Toyo Kaisha Ltd. was used for filtration. Each of the filtrate was used as the oxidant and dopant solution in Examples 31 and 32 and Comparative Examples 4 to 6, respectively. For the calculation purpose, the solution had a solid content concentration of 45.0%, the content ratio of the glycidyl compound X with respect to ferric methoxybenzenesulfonate was B %, the content ratio of the polyalcohol Y with respect to ferric methoxybenzenesulfonate was D %. The details of X, Y, A, B, C, D and E are shown in Table 3. Also in Table 3, polyethylene glycol diglycidyl ether is simply called as "PEG-DG," epoxy propanol is simply called as "EPPOL," glycerol is simply called "GLYOL."

TABLE 3

| | glycidyl compound | | | polyalcohol | | | amount of ethanol |
| | X | A(g) | B(%) | Y | C(g) | D(%) | E(g) |
|---|---|---|---|---|---|---|---|
| Ex. 31 | PEG-DG | 18.8 | 28 | GLYOL | 6.7 | 10 | 23.8 |
| Ex. 32 | EPPOL | 18.8 | 28 | GLYOL | 6.7 | 10 | 23.8 |
| Comp. Ex. 4 | — | 0 | 0 | — | 0 | 0 | 49.3 |
| Comp. Ex. 5 | — | 0 | 0 | GLYOL | 6.7 | 10 | 42.6 |
| Comp. Ex. 6 | PEG 400 | 18.8 | 28 | GLYOL | 6.7 | 10 | 23.8 |

Evaluation (1) of Solid Electrolyte Capacitor

As to the Evaluation (1) of the solid electrolyte capacitors, the following capacitors were used. A monomer, 3,4-ethylenedioxythiophene was used, and each of the oxidant and dopant solutions prepared in Examples 1 to 30 were used. The set capacitance of 10 μF or more and the set ESR of 40 mΩ or less were contemplated to prepare winding type aluminum solid electrolyte capacitors of Examples 33 to 62. In the same way, the oxidant and dopant solutions of Comparative Examples 1 to 3 were used to produce winding type aluminum solid electrolyte capacitors of Comparative Examples 7 to 9. Their capacitor properties were compared. Also, the properties of the oxidant and dopant solutions used in preparation of the winding type aluminum solid electrolyte capacitors of Examples 1 to 30 and Comparative Examples 1 to 3 were evaluated.

Examples 33 to 62 and Comparative Examples 7 to 9

First, there is described for the preparation where the oxidant and dopant solution of Example 1 was used to prepare a winding type aluminum solid electrolyte capacitor of Example 33.

The surface of an aluminum foil was subject to an etching process. The aluminum foil after the etching processing was immersed in a 12% aqueous ammonium solution. A voltage of 80V was applied to the aluminum foil in the aqueous ammonium solution, thereby preparing a dielectric layer on the surface of the aluminum foil, which was used as a positive electrode. A lead terminal was attached to the positive electrode. Another lead terminal was attached to an aluminum foil serving as a negative electrode. The positive and negative electrodes with the lead terminals were wound via a separator to prepare a capacitor element to be produced into a winding type aluminum solid electrolyte capacitor with the set capacitance of 10 μF or more and the set ESR of 40 mΩ or less.

The capacitor element was immersed in a monomer solution prepared from 3,4-ethylenedioxythiophene (manufactured by Tayca Corporation; 20 ml) added to methanol (80 ml), and then, taken out therefrom. Then, the capacitor element was dried at 50° C. for 10 minutes. Then, the capacitor element was immersed in the oxidant and dopant solution of Example 1 (100 ml), and taken out therefrom, and then, it was heated at 70° C. for 2 hours, and at 180° C. for one hour to polymerize the monomer, 3,4-ethylenedioxythiophene. Thereby, a solid electrolyte layer of a conductive polymer was provided, which had a polymer backbone made from 3,4-ethylenedioxythiophene. An exterior package was provided to obtain a winding type aluminum solid electrolyte capacitor of Example 33.

Instead of using the oxidant and dopant solution of Example 1, each of the oxidant and dopant solution of Examples 2 to 30 and Comparative Examples 1 to 3 was used. Other than that, the same procedures as the use of the oxidant and dopant solution of Example 1 were carried out. Thereby, the winding type aluminum solid electrolyte capacitors of Examples 34 to 62 and Comparative Examples 7 to 9 were obtained.

With respect to the winding type aluminum solid electrolyte capacitors of Examples 33 to 62 and Comparative Examples 7 to 9, an LCR meter (4284A) manufactured by Hewlett Packard Corporation was used. At a condition of 25° C., the ESR was measured at 100 kHz, and the capacitance was measured at 120 Hz. The breakdown voltage was measured, using PRk650-2.5 manufactured by Matsusada Precision Inc., at a condition of 25° C. and a voltage increase of 1V/min. The results are shown in Tables 4 to 5. The measurements were repeated on 50 samples of each example. The ESR value and the capacitance value in Tables 4 and 5 are the averages of the fifty samples, rounded to one decimal place. The breakdown voltage value is shown with rounding off to the closest whole number. The oxidant and dopant solutions are shown by the numbers of the Examples and the Comparative Examples.

TABLE 4

|  | oxidant and dopant solution | capacitance (μF) | ESR (mΩ) | breakdown voltage (V) |
|---|---|---|---|---|
| Ex. 33 | Ex. 1 | 11.6 | 34.4 | 42 |
| Ex. 34 | Ex. 2 | 11.6 | 34.6 | 44 |
| Ex. 35 | Ex. 3 | 11.5 | 34.7 | 46 |
| Ex. 36 | Ex. 4 | 11.4 | 34.7 | 47 |
| Ex. 37 | Ex. 5 | 11.4 | 34.7 | 47 |
| Ex. 38 | Ex. 6 | 11.3 | 34.8 | 48 |
| Ex. 39 | Ex. 7 | 11.5 | 35.1 | 41 |
| Ex. 40 | Ex. 8 | 11.4 | 34.1 | 42 |
| Ex. 41 | Ex. 9 | 11.3 | 34.9 | 48 |
| Ex. 42 | Ex. 10 | 11.3 | 35.0 | 49 |
| Ex. 43 | Ex. 11 | 11.9 | 34.8 | 47 |
| Ex. 44 | Ex. 12 | 11.8 | 34.9 | 48 |
| Ex. 45 | Ex. 13 | 11.6 | 34.7 | 47 |
| Ex. 46 | Ex. 14 | 11.5 | 34.8 | 48 |
| Ex. 47 | Ex. 15 | 11.4 | 34.7 | 49 |
| Ex. 48 | Ex. 16 | 11.3 | 34.6 | 47 |
| Ex. 49 | Ex. 17 | 11.4 | 34.7 | 48 |
| Ex. 50 | Ex. 18 | 11.6 | 34.8 | 48 |

TABLE 5

|  | oxidant and dopant solution | capacitance (μF) | ESR (mΩ) | breakdown voltage (V) |
|---|---|---|---|---|
| Ex. 51 | Ex. 19 | 11.6 | 34.2 | 46 |
| Ex. 52 | Ex. 20 | 11.5 | 34.1 | 46 |
| Ex. 53 | Ex. 21 | 11.3 | 34.4 | 44 |
| Ex. 54 | Ex. 22 | 11.6 | 34.6 | 43 |
| Ex. 55 | Ex. 23 | 11.6 | 34.6 | 43 |
| Ex. 56 | Ex. 24 | 11.5 | 34.5 | 44 |
| Ex. 57 | Ex. 25 | 11.7 | 33.0 | 48 |
| Ex. 58 | Ex. 26 | 11.6 | 33.4 | 47 |
| Ex. 59 | Ex. 27 | 11.6 | 34.5 | 48 |
| Ex. 60 | Ex. 28 | 11.4 | 34.1 | 46 |
| Ex. 61 | Ex. 29 | 11.3 | 34.4 | 47 |
| Ex. 62 | Ex. 30 | 11.8 | 33.5 | 48 |
| Comp. Ex. 7 | Comp. Ex. 1 | 11.7 | 39.3 | 22 |
| Comp. Ex. 8 | Comp. Ex. 2 | 11.7 | 34.7 | 21 |
| Comp. Ex. 9 | Comp. Ex. 3 | 11.6 | 37.4 | 21 |

As shown in Tables 4 and 5, each of the winding type aluminum solid electrolyte capacitors of Examples 33 to 62 and Comparative Examples 7 to 9 had a capacitance in the level of 11 μF, the set capacitance of 10 μF or more, an ESR in the level of 30 mΩ, and the set ESR of 40 mΩ or less. However, the winding type aluminum solid electrolyte capacitors of Comparative Examples 7 to 9 had a breakdown voltage of 21 to 22V, whereas the winding type aluminum solid electrolyte capacitors of Examples 33 to 62 had a breakdown voltage in the level of 40V. In other words, the breakdown voltage of the winding type aluminum solid electrolyte capacitors of Examples 33 to 62 had about twice larger than that of the winding type aluminum solid electrolyte capacitors of Comparative Examples 7 to 9, showing an excellent voltage resistance of the invention.

In detail, the winding type aluminum solid electrolyte capacitor of Example 39 was prepared by using the oxidant and dopant solution of Example 7 which had been prepared by adding only glycidyl compound. Example 39 satisfied the set capacitance and the set ESR. Example 39 had a breakdown voltage of 41V, which was almost twice as large as that of the winding type aluminum solid electrolyte capacitor of Comparative Examples 7 to 9. Example 39 shows an excellent voltage resistance of the invention. Furthermore, the winding type aluminum solid electrolyte capacitors of Examples 33 to 38 and 40 to 62 were prepared by using the oxidant and dopant solution of Examples 1 to 6 and 8 to 30 including the glycidyl compound and the polyalcohol. Examples 33 to 38 and 40 to 62 (1 to 6 and 8 to 30), of course, satisfied the set capacitance and the set ESR. In addition, Examples 33 to 38 and 40 to 62 (1 to 6 and 8 to 30) had a higher breakdown voltage than that of the winding type aluminum solid electrolyte capacitor of Example 39, showing more excellent voltage resistance. Also, Examples 1 to 6 and 8 to 30 had a lower ESR than that of the winding type aluminum solid electrolyte capacitor of Example 39, showing an improvement in the property.

By contrast, the oxidant and dopant solution of Comparative Example 1 was prepared without using the glycidyl compound and the polyalcohol; the oxidant and dopant solution of Comparative Example 2 was prepared with the polyalcohol but without the glycidyl compound; and the oxidant and dopant solution of Comparative Example 3 was prepared with the polyalcohol, and adding polyethylene glycol 400 (PEG 400) instead of the glycidyl compound. The winding type aluminum solid electrolyte capacitors of Comparative Examples 7 to 9 by using Comparative Examples 1 to 3 satisfied the set capacitance and the set ESR, but lowered the breakdown voltage. As results, the voltage resistance of Comparative Examples 7 to 9 was inferior to those of the Examples.

As results, the oxidant and dopant solutions of Example 1 to 30, used in the production of the winding type aluminum solid electrolyte capacitors of Examples 33 to 62, were excellent in the properties when using in the conductive polymer production, compared with the oxidant and dopant solutions of Comparative Examples 1 to 3 which were used in the production of the winding type aluminum solid electrolyte capacitors in Comparative Examples 7 to 9. Also, it was found that the conductive polymers obtained by the oxidation polymerization of 3,4-ethylenedioxythiophene using the oxidant and dopant solutions of Examples 1 to 30 were excellent in the properties.

Evaluation (2) of Solid Electrolyte Capacitor

As to the Evaluation (2) of the solid electrolyte capacitors, the winding type aluminum solid electrolyte capacitors of Examples 63 to 64 were used, which had been prepared by using 3,4-ethylenedioxythiophene as a monomer, through the oxidation polymerization with the oxidant and dopant solutions of Examples 31 to 32 including ferric methoxybenzenesulfonate, an oxidant and dopant. The winding type aluminum solid electrolyte capacitors of Examples 63 to 64 were prepared to satisfy the set capacitance of 10 μF or more and the set ESR of 40 mΩ or less. They were compared with the winding type aluminum solid electrolyte capacitors of Comparative Examples 10 to 12, which had been prepared by using the oxidant and dopant solutions of Comparative Examples 4 to 6. The capacitor properties were compared. Also, the oxidant and dopant solutions of Examples 31 to 32 and Comparative Examples 4 to 6 were evaluated.

Examples 63 to 64 and Comparative Examples 10 to 12

First, there is described for the preparation of the winding type aluminum solid electrolyte capacitor of Example 63, using the oxidant and dopant solution of Example 31.

The capacitor element same as used in e.g., Example 33 was immersed in a monomer solution prepared by adding 3,4-ethylenedioxythiophene (manufactured by Tayca Corporation; 20 ml) into methanol (80 ml), and taken out therefrom. Then, it was dried at 50° C. for 10 minutes. Then, the capacitor element was immersed in the oxidant and dopant solution (100ml) of Example 31, and taken out therefrom. Then, it was heated at 70° C. for 2 hours, and at 180° C. for one hour to polymerize the monomer, 3,4-ethylenedioxythiophene. Thereby, a solid electrolyte layer of a conductive polymer was provided, whose polymer backbone is made from 3,4-ethylenedioxythiophene. Then, an exterior package was provided to obtain the winding type aluminum solid electrolyte capacitor of Example 63.

Instead of using the oxidant and dopant solution of Example 31, the oxidant and dopant solutions of Example 32 and Comparative Examples 4 to 6 were used. Other than that, the same procedures as the use of the oxidant and dopant of Example 31 were carried out to prepare the winding type aluminum solid electrolyte capacitors by using each of the oxidant and dopant solutions. Thereby, the winding type aluminum solid electrolyte capacitors of Example 64 and Comparative Examples 10 to 12 were obtained.

As to the winding type aluminum solid electrolyte capacitors of Examples 63 to 64 and Comparative Examples 10 to 11, the measurements of capacitor properties were carried out in the same manner as Example 33. The results are shown in Table 6.

TABLE 6

|  | oxidant and dopant solution | capacitance (µF) | ESR (mΩ) | breakdown voltage (V) |
| --- | --- | --- | --- | --- |
| Ex. 63 | Ex. 31 | 11.9 | 33.2 | 48 |
| Ex. 64 | Ex. 32 | 11.8 | 33.6 | 48 |
| Comp. Ex. 10 | Comp. Ex. 4 | 11.5 | 37.5 | 24 |
| Comp. Ex. 11 | Comp. Ex. 5 | 11.8 | 36.8 | 25 |
| Comp. Ex. 12 | Comp. Ex. 6 | 11.7 | 35.5 | 25 |

As shown in Table 6, the winding type aluminum solid electrolyte capacitors of Examples 63 to 64 and Comparative Examples 10 to 12 had a capacitance in the level of 11 µF, satisfying the requirements of the set capacitance of 10 µF or more. They had an ESR in the level of 30 mΩ, satisfying the requirements of the set ESR of 40 mΩ or less. However, the winding type aluminum solid electrolyte capacitors of Examples 63 to 64 had a high breakdown voltage of 48V, whereas the winding type aluminum solid electrolyte capacitors of Comparative Examples 10 to 12 had a breakdown voltage of 24 to 25V; they were about the half of the breakdown voltage of the winding type aluminum solid electrolyte capacitors of Examples 63 to 64.

That is, the winding type aluminum solid electrolyte capacitors of Examples 63 to 64 satisfied the requirements of the set capacitance and the set ESR while having a breakdown voltage as high as 48V. Compared with the winding type aluminum solid electrolyte capacitors of Comparative Examples 10 to 12, the voltage resistance of the present invention was excellent. Even when using the oxidant and dopant of ferric methoxybenzenesulfonate, there was found the same tendency as using the oxidant and dopant of ferric p-toluenesulfonate. It was shown that the oxidant and dopant solutions of Examples 31 to 32 were more excellent in the properties than the oxidant and dopant solutions of Comparative Examples 4 to 6, as an oxidant and dopant solution used in the conductive polymer production. Excellent properties were also shown in the conductive polymer prepared from 3,4-ethylenedioxythiophene by means of the oxidation polymerization using the oxidant and dopant solutions of Examples 31 to 32.

In Evaluations (3) to (8) of the solid electrolyte capacitors as discussed later, a monomer of an alkylated ethylenedioxythiophene was used to produce the conductive polymer. First, there is described for the synthesis methods of the alkylated ethylenedioxythiophene.

Preparation of Alkylated Ethylenedioxythiophene

Synthesis Example 1

Synthesis of Methylated Ethylenedioxythiophene (i.e., 2-methyl-2,3-dihydro-thieno [3,4-b][1,4]dioxine)

Through the Steps 1-(1) to 1-(3) below, methylated ethylenedioxythiophene was synthesized.

1-(1): Synthesis of Propane-1,2-diyl-bis(4-methylbenzenesulfonate)

Into a reaction vessel with ice cooling, tosyl chloride (7.86 kg; 40 moles) and 1,2-dichloro ethane (7 kg) were put. The inside of the vessel were cooled at 10° C. with stirring, into which triethylamine (5.11 kg, 50 moles) were dropped.

While the above mixture was stirred and the inside of the vessel was kept not to exceed 40° C., 1,2-propanediol (1.55 kg; 20 moles) were carefully dropped into the mixture over a period of 60 minutes. While the inside of the vessel was kept not to exceed 40° C., the mixture was stirred for 6 hours.

The reacted liquid was cooled at room temperature. Water (4 kg) was added with stirring. Then, they were placed still. The reacted liquid was divided into two phases; the water phase and the organic phase. The organic phase was condensed to obtain dark red oil.

Into a reaction vessel with ice cooling, methanol (500 g) was put, and then, the dark red oil above was dropped with stirring. The precipitated white solids were filtered and collected. The white solids was washed with a small amount of methanol, and dried to obtain a product, propane-1,2-diyl-bis (4-methylbenzene sulfonate) (3.87 kg).

1-(2): Synthesis of 2-methyl-2,3-dihydro-thieno[3,4-b][1,4]dioxine-5,7-dicarboxylic acid Into a reaction vessel, disodium-2,5-bis(alkoxycarbonyl) thiophene-3,4-diolate(508; 1.68 moles), propane-1,2-diyl-bis(4-methylbenzene sulfonate) (960 g; 2.5 moles) obtained by Step 1-(1), potassium carbonate (46 g; 0.33 moles), and dimethylformamide (2.5 kg) were put. While the inside of the vessel was kept at 120° C., the mixture was stirred for 4 hours.

The reacted liquid was condensed, and into the remaining brown solids, 5% sodium hydrogen carbonate aqueous solution (3.7 kg) was put. At room temperature, the mixture was stirred for 15 minutes, and then, the brown solids were filtered and collected. Into a reaction vessel, the filtered brown solids and 7% sodium hydroxide aqueous solution (2.47 kg) were put. While the inside of the vessel was kept at 80° C., the stirring was continued for 2 hours.

The inside of the vessel was cooled at room temperature. Not to exceed the inside of the vessel above 30° C., 98% sulfuric acid (759 g) was carefully dropped into the reacted liquid. While the inside of the vessel was kept at 80° C., the stirring was continued for 2 hours.

The inside of the vessel was cooled at room temperature while stirring. The precipitated gray solids were filtered and collected. Then, the reacted liquid was cooled, and the gray solids were filtered and collected. The gray solids was washed with a small amount of water, and then, dried to obtain a product, 2-methyl-2,3-dihydro-thieno[3,4-b][1,4]dioxine-5,7-dicarboxylic acid (310 g).

1-(3): Synthesis of methylated ethylenedioxythiophene (2-methyl-2,3-dihydro-thieno[3,4-b][1,4]dioxine)

After Step 1-(2), 2-methyl-2,3-dihydro-thieno[3,4-b][1,4]dioxine-5,7-dicarboxylic acid (880 g; 3.6 moles) was dissolved in a reaction vessel with 3 kg of polyethylene glycol 300 (manufactured by Hayashi Pure Chemical Ind., Ltd.), and then, copper oxide (176 g) was added. The mixture was distilled at an internal pressure of 20 hpa by gradually raising the temperature. Water and the initial distilled fraction were distilled first, and then, the main fraction including polyethylene glycol 300 was distilled, into which water (400 g) was added and placed still.

The solution with two phases were divided. The lower phase, yellow transparent liquid was the product, methylated ethylenedioxythiophene (345 g).

Synthesis Example 2

Synthesis of ethylated ethylenedioxythiophene (i.e., 2-ethyl-2,3-dihydro-thieno[3,4-b][1,4]dioxine)

Instead of 1,2-propanediol, 1,2-butanediol was used. Other than that, the same procedures as Synthesis Example 1 were carried out to obtain yellow transparent liquid, ethylated ethylenedioxythiophene (130 g).

Synthesis Example 3

Synthesis of propylated ethylenedioxythiophene (i.e., 2-propyl-2,3-dihydro-thieno[3,4-b][1,4]dioxine)

Instead of 1,2-propanediol, 1,2-pentanediol was used. Other than that, the same procedures as Synthesis Example 1 were carried out to obtain yellow transparent liquid, propylated ethylenedioxythiophene (180 g).

Synthesis Example 4

Synthesis of butylated ethylenedioxythiophene (i.e., 2-butyl-2,3-dihydro-thieno[3,4-b][1,4]dioxine)

1,2-propanediol, 1,2-hexanediol was used. Other than that, the same procedures as Synthesis Example 1 were carried out to obtain yellow transparent liquid, butylated ethylenedioxythiophene (100 g).

Evaluation (3) of Solid Electrolyte Capacitor

In Evaluation (3) of the solid electrolyte capacitors, the winding type aluminum solid electrolyte capacitors were used, which had been prepared by using a monomer mixture of 3,4-ethylenedioxythiophene and methylated ethylenedioxythiophene, through the oxidation polymerization with the oxidant and dopant solutions of Examples 3, 4 and 7. The capacitor properties were evaluated.

Examples 65 to 67

There is described for the preparation of the winding type aluminum solid electrolyte capacitor of Example 65 by using the oxidant and dopant solution of Example 3. The capacitor element of Examples 65 to 67 was the same as those used in e.g., Example 33, requiring the winding type aluminum solid electrolyte capacitor to satisfy the set capacitance of 10 µF or more and the set ESR of 40 mΩ or less.

That is, 3,4-ethylenedioxythiophene (manufactured by Tayca Corporation; 5 ml) was mixed with methylated ethylenedioxythiophene 15 ml prepared by Synthesis Example 1. Into the mixture solution, methanol (80 ml) was added to provide a monomer solution, into which a capacitor element was immersed in, and then, taken out therefrom. Then, it was dried at 50° C. for 10 minutes. Then, the capacitor element was immersed in the oxidant and dopant solution (100 ml) of Example 3, and taken out therefrom. Then, it was heated at 70° C. for 2 hours, and at 180° C. for one hour to polymerization the monomer. Thereby, a solid electrolyte layer of a conductive polymer was provided which had a polymer backbone made from a mixture of 3,4-ethylenedioxythiophene and methylated ethylenedioxythiophene. An exterior package was provided to obtain a winding type aluminum solid electrolyte capacitor of Example 65.

Instead of the oxidant and dopant solution of Example 3, the oxidant and dopant solutions of Examples 4 and 7 were used. Other than that, the same procedures as the use of the oxidant and dopant solution of Example 3 were carried out. Thereby, winding type aluminum solid electrolyte capacitors of Examples 66 and Example 67 were obtained by using each of the oxidant and dopant solutions.

As to the winding type aluminum solid electrolyte capacitors of Examples 65 to 67, the ESR, the capacitance and the breakdown voltage were measured in the same manner as Example 33. The results are shown in Table 7.

TABLE 7

|  | oxidant and dopant solution | Capacitance (µF) | ESR (mΩ) | breakdown voltage (V) |
| --- | --- | --- | --- | --- |
| Ex. 65 | Ex. 3 | 11.7 | 32.8 | 54 |
| Ex. 66 | Ex. 4 | 11.7 | 32.9 | 53 |
| Ex. 67 | Ex. 7 | 11.8 | 32.4 | 48 |

As shown in Table 7, the winding type aluminum solid electrolyte capacitors of Examples 65 to 67 had a capacitance of 11.7 to 11.8 µF, that is, satisfying the requirements of the set capacitance in the level of 10 µF or more. They had an ESR of 32.4 to 32.9 mΩ satisfying the requirements of the set ESR of 40 mΩ or less. They had a breakdown voltage of 48 to 54V, having an excellent voltage resistance.

The winding type aluminum solid electrolyte capacitors of Examples 65 to 67 were compared with the winding type aluminum solid electrolyte capacitors of Examples 35, 36 and 39. They had used the same oxidant and dopant solution. As results, the winding type aluminum solid electrolyte capacitors of Examples 65 to 67 in which a monomer mixture of 3,4-ethylenedioxythiophene and methylated ethylenedioxythiophene were used were more excellent in the capacitor properties of having high breakdown voltage, high capacitance and low ESR than the winding type aluminum solid electrolyte capacitors of Examples 35, 36 and 39 in which a monomer, 3,4-ethylenedioxythiophene alone was used.

In detail, both of the winding type aluminum solid electrolyte capacitors of Examples 65 and 35 used the oxidant and dopant solution of Example 3. However, Example 35 used the monomer, 3,4-ethylenedioxythiophene alone to prepare the winding type aluminum solid electrolyte capacitor. As shown in Table 4, Example 35 had a breakdown voltage of 46V, a capacitance of 11.41F, an ESR of 34.7 mΩ. By contrast, Example 65 used the monomer mixture of 3,4-ethylenedioxythiophene and methylated ethylenedioxythiophene to prepare the winding type aluminum solid electrolyte capacitor. As shown in Table 7, Example 65 had a breakdown voltage of 54V, a capacitance of 11.8 μF, and an ESR of 31.1 mΩ As results, the winding type aluminum solid electrolyte capacitor of Example 65 was more excellent in the capacitor properties having high breakdown voltage, high capacitance and low ESR than that of Example 35.

Also the winding type aluminum solid electrolyte capacitors of Examples 66 and 36 using the same oxidant and dopant solution of Example 4 were compared. The winding type aluminum solid electrolyte capacitor of Example 66 in which the monomer mixture of 3,4-ethylenedioxythiophene and methylated ethylenedioxythiophene was used was more excellent in the capacitor properties of having high breakdown voltage, high capacitance and low ESR than that of Example 36 in which the monomer, 3,4-ethylenedioxythiophene alone was used.

Also the winding type aluminum solid electrolyte capacitors of Examples 67 and 39 using the same oxidant and dopant solution of Example 7 were compared. The winding type aluminum solid electrolyte capacitor of Example 67 in which the monomer mixture of 3,4-ethylenedioxythiophene and methylated ethylenedioxythiophene was used was more excellent in the capacitor properties of having high breakdown voltage, high capacitance and low ESR than that of Example 39 in which the monomer, 3,4-ethylenedioxythiophene alone was used.

Evaluation (4) of Solid Electrolyte Capacitor

In Evaluation (4) of the solid electrolyte capacitors, the winding type aluminum solid electrolyte capacitors were used, which had been prepared by using the monomer mixture of 3,4-ethylenedioxythiophene and ethylated ethylenedioxythiophene, through the oxidation polymerization with the oxidant and dopant solutions of Examples 3, 4 and 7.

Examples 68 to 70

There is described for the preparation of the winding type aluminum solid electrolyte capacitor of Example 68 by using the oxidant and dopant solution of Example 3. The capacitor elements used in Examples 68 to 70 were the same as used in e.g., Example 33, and required the winding type aluminum solid electrolyte capacitor to satisfy the set capacitance of 10 μF or more and the set ESR of 40 mΩ or less.

In detail, 3,4-ethylenedioxythiophene (manufactured by Tayca Corporation; 10 ml) was mixed with ethylated ethylenedioxythiophene (10 ml) prepared by Synthesis Example 2. Into the mixture solution, methanol (80 ml) was added to provide a monomer solution, into which a capacitor element was immersed in, and taken out therefrom. Then, it was dried at 50° C. for 10 minutes. Then, the capacitor element was immersed in the oxidant and dopant solution (100 ml) of Example 3, and taken out therefrom. Then, it was heated at 70° C. for 2 hours and at 180° C. for one hour to polymerize the monomer. Thereby, a solid electrolyte layer of a conductive polymer was provided which had a polymer backbone made from the mixture of 3,4-ethylenedioxythiophene and ethylated ethylenedioxythiophene. An exterior package was provided to obtain the winding type aluminum solid electrolyte capacitor of Example 68.

Instead of the oxidant and dopant solution of Example 3, the oxidant and dopant solutions Examples 4 and 7 were used. Other than that, the same procedures as the use of the oxidant and dopant solution of Example 3 were carried out to prepare winding type aluminum solid electrolyte capacitors using each of the oxidant and dopant solutions. Thereby, the winding type aluminum solid electrolyte capacitors of Examples 69 and 70 were obtained.

As to the winding type aluminum solid electrolyte capacitors of Examples 68 to 70, the ESR, the capacitance and the breakdown voltage were measured in the same manner as Example 33. The results are shown in Table 8.

TABLE 8

| | oxidant and dopant solution | capacitance (μF) | ESR (mΩ) | breakdown voltage (V) |
| --- | --- | --- | --- | --- |
| Ex. 68 | Ex. 3 | 11.8 | 31.1 | 56 |
| Ex. 69 | Ex. 4 | 11.8 | 31.2 | 55 |
| Ex. 70 | Ex. 7 | 11.8 | 31.8 | 49 |

As shown in Table 8, the winding type aluminum solid electrolyte capacitors of Examples 68 to 70 had a capacitance of 11.8 μF, satisfying the requirements of the set capacitance of 10 μF or more. They had an ESR of 31.1 to 31.8 mΩ, satisfying the requirements of the set ESR of 40 mΩ or less. They had a breakdown voltage of 49 to 56V, having an excellent voltage resistance.

The winding type aluminum solid electrolyte capacitors of Examples 68 to 70 and Examples 35, 36 and 39 were prepared by using the same oxidant and dopant solution. Comparing them, the winding type aluminum solid electrolyte capacitors of Examples 68 to 70 in which the monomer mixture of 3,4-ethylenedioxythiophene and ethylated ethylenedioxythiophene was used were more excellent in the capacitor properties having high breakdown voltage, high capacitance and low ESR than those of Examples 35, 36 and 39 in which the monomer, 3,4-ethylenedioxythiophene alone was used.

In detail, both of the winding type aluminum solid electrolyte capacitors of Examples 68 and 35 were prepared by using the same oxidant and dopant solution of Example 3. However, Example 35 used the monomer, 3,4-ethylenedioxythiophene alone to prepare the winding type aluminum solid electrolyte capacitor. As shown in Table 4, it had a breakdown voltage of 46V, a capacitance of 11.5 μF, and an ESR of 34.7 mΩ. By contrast, Example 68 used the monomer mixture of 3,4-ethylenedioxythiophene and ethylated ethylenedioxythiophene to prepare the winding type aluminum solid electrolyte capacitor. As shown in Table 8, it had a breakdown voltage of 56V, a capacitance of 11.8 μF, and an ESR of 31.1 mΩ. As results, Example 68 was more excellent in the capacity properties of having high breakdown voltage, high capacitance and low ESR than that of Example 35.

Also, the winding type aluminum solid electrolyte capacitors of Examples 69 and 36 were compared, which had been prepared by using the same oxidant and dopant solution of Example 4. The winding type aluminum solid electrolyte capacitor of Example 69 was prepared by using the monomer mixture of 3,4-ethylenedioxythiophene and ethylated ethylenedioxythiophene. Example 69 was more excellent in the capacity properties of having high breakdown voltage, high capacitance and low ESR than that of Example 36 in which the monomer, 3,4-ethylenedioxythiophene alone was used.

Also, the winding type aluminum solid electrolyte capacitors of Examples 70 and 39 which had been prepared by using the oxidant and dopant solution of Example 7 were compared. The winding type aluminum solid electrolyte capacitor of Example 70 was prepared by using the monomer mixture of 3,4-ethylenedioxythiophene and ethylated ethylenedioxythiophene. Example 70 was more excellent in the capacity properties of having high breakdown voltage, high capacitance and low ESR than that of Example 39 in which the monomer, 3,4-ethylenedioxythiophene alone was used.

Evaluation (5) of Solid Electrolyte Capacitor

In the Evaluation (5) of the solid electrolyte capacitors, the winding type aluminum solid electrolyte capacitors were used, which had been prepared by using the mixture of monomers of 3,4-ethylenedioxythiophene and propylated ethylenedioxythiophene, through the oxidation polymerization with the oxidant and dopant solutions of Examples 3, 4 and 7. The capacitor properties were evaluated.

Examples 71 to 73

There is described for the preparation of the winding type aluminum solid electrolyte capacitor of Example 71 by using the oxidant and dopant solution of Example 3. The capacitor elements used in Examples 71 to 73 were the same as that used in e.g., Example 33, and the winding type aluminum solid electrolyte capacitor was required to satisfy the set capacitance of 10 µF or more and the set ESR of 40 mΩ or less.

In detail, 3,4-ethylenedioxythiophene (manufactured by Tayca Corporation; 13 ml) was mixed with propylated ethylenedioxythiophene (7 ml) of Synthesis Example 3. Into the mixture solution, methanol (80 ml) was added to provide a monomer solution, into which a capacitor element was immersed in, and taken out therefrom. Then, it was dried at 50° C. for 10 minutes. Then, the capacitor element was immersed in the oxidant and dopant solution (100 ml) of Example 3, and taken out therefrom. Then, it was heated at 70° C. for 2 hours and at 180° C. for one hour to polymerize the monomer. Thereby, a solid electrolyte layer of a conductive polymer was formed, which had a polymer backbone made from the mixture of 3,4-ethylenedioxythiophene and propylated ethylenedioxythiophene. An exterior package was provided to obtain the winding type aluminum solid electrolyte capacitor of Example 71.

Instead of the oxidant and dopant solution of Example 3, the oxidant and dopant solutions of Examples 4 and 7 were used. Other than that, the same procedures as the use of the oxidant and dopant solution of Example 3 were carried out. Thereby, the winding type aluminum solid electrolyte capacitors of Examples 72 and 73 were produced by using each of the oxidant and dopant solutions were produced.

As to the winding type aluminum solid electrolyte capacitors of Examples 71 to 73, the ESR, the capacitance and the breakdown voltage were measured in the same manner as Example 33. The results are shown in Table 9.

TABLE 9

| | oxidant and dopant solution | capacitance (µF) | ESR (mΩ) | breakdown voltage (V) |
|---|---|---|---|---|
| Ex. 71 | Ex. 3 | 11.8 | 31.1 | 55 |
| Ex. 72 | Ex. 4 | 11.7 | 31.6 | 55 |
| Ex. 73 | Ex. 7 | 11.8 | 31.9 | 48 |

As shown in Table 9, the winding type aluminum solid electrolyte capacitors of Examples 71 to 73 had a capacitance of 11.7 to 11.8 µF, satisfying the requirements of the set capacitance of 10 µF or more. They had an ESR of 31.1 to 31.9 mΩ, satisfying the requirements of the set ESR of 40 mΩ or less. They had a breakdown voltage of 48 to 55V, showing excellent voltage resistance.

The winding type aluminum solid electrolyte capacitor of Examples 71 to 73 and Examples 35, 36, and 39 were prepared by using the same oxidant and dopant solution. Examples 71 to 73 used the monomer mixture of 3,4-ethylenedioxythiophene and propylated ethylenedioxythiophene. Examples 35, 36 and 39 used the monomer, 3,4-ethylenedioxythiophene alone. Comparing them, the winding type aluminum solid electrolyte capacitor of Examples 71 to 73 were more excellent in the capacity properties of having high breakdown voltage, high capacitance and low ESR than the winding type aluminum solid electrolyte capacitors of Examples 35, 36 and 39.

In detail, the winding type aluminum solid electrolyte capacitors of Examples 71 and 35 used the same oxidant and dopant solution of Example 3. Example 35 used the monomer, 3,4-ethylenedioxythiophene alone to prepare the winding type aluminum solid electrolyte capacitor. As shown in Table 4, Example 35 had a breakdown voltage of 46V, a capacitance of 11.5 µF, and an ESR of 34.7 mΩ. Example 71 used the monomer mixture of 3,4-ethylenedioxythiophene and propylated ethylenedioxythiophene to prepare the winding type aluminum solid electrolyte capacitor. As shown in Table 9, Example 71 had breakdown voltage of 55V, a capacitance of 11.8 µF, and an ESR of 31.2 mΩ. As results, the winding type aluminum solid electrolyte capacitor of Example 71 was more excellent in the capacitor properties of having high breakdown voltage, high capacitance and low ESR than that of Example 35.

Also, the winding type aluminum solid electrolyte capacitors of Examples 72 and 36 were compared, which had been made by using the same oxidant and dopant solution of Example 4. The winding type aluminum solid electrolyte capacitor of Example 72 was prepared by using the monomer mixture of 3,4-ethylenedioxythiophene and propylated ethylenedioxythiophene. Example 72 was more excellent in the capacitor properties of having high breakdown voltage, high capacitance and low ESR than that of Example 36 in which the monomer, 3,4-ethylenedioxythiophene alone was used.

Also, the winding type aluminum solid electrolyte capacitors of Examples 73 and 39 were compared, which had been prepared by using the same oxidant and dopant solution of Example 7. The winding type aluminum solid electrolyte capacitor of Example 73 was prepared by using the monomer mixture of 3,4-ethylenedioxythiophene and propylated ethylenedioxythiophene. Example 73 was more excellent in the capacitor properties of having high breakdown voltage, high capacitance and low ESR than that of Example 39 in which the monomer, 3,4-ethylenedioxythiophene alone was used.

Evaluation (6) of Solid Electrolyte Capacitor

In the Evaluation (6) of the solid electrolyte capacitors, the winding type aluminum solid electrolyte capacitors were used, which had been prepared by using the monomer mixture of 3,4-ethylenedioxythiophene and butylated ethylenedioxythiophene, through the oxidation polymerization with the oxidant and dopant solutions of Examples 3, 4 and 7. Thereby, the capacitor properties were evaluated.

Examples 74 to 76

There is described for the preparation of the winding type aluminum solid electrolyte capacitor of Example 74 in which the oxidant and dopant solution of Example 3 was used. The capacitor elements used in Examples 74 to 76 were the same as that used in Example 33, requiring the winding type aluminum solid electrolyte capacitors to satisfy the set capacitance of 10 µF or more and the set ESR of 40 mΩ or less.

In detail, 3,4-ethylenedioxythiophene (manufactured by Tayca Corporation; 15 ml) and butylated ethylenedioxythiophene (5 ml) of Synthesis Example 4 were mixed. Into the mixture solution, methanol (80 ml) was added to prepare a monomer solution, into which a capacitor element was immersed in, and taken out therefrom. Then, it was dried at 50° C. for 10 minutes. Then, the capacitor element was immersed in the oxidant and dopant solution (100 ml) of Example 3, and then, taken out therefrom. It was, then, heated at 70° C. for 2 hours and at 180° C. for one hour to polymerize the monomer. Thereby, a solid electrolyte layer of a conductive polymer was provided which had a polymer backbone made from the mixture of 3,4-ethylenedioxythiophene and butylated ethylenedioxythiophene. An exterior package was provided to obtain the winding type aluminum solid electrolyte capacitor of Example 74.

Instead of the oxidant and dopant solution of Example 3, the oxidant and dopant solutions of Examples 4 and 7 were used. Other than that, the same procedures as the use of the oxidant and dopant solution of Example 3 were carried out. The winding type aluminum solid electrolyte capacitors using each of the oxidant and dopant solutions were prepared. Thereby, the winding type aluminum solid electrolyte capacitors of Examples 75 and 76 were obtained.

With respect to the winding type aluminum solid electrolyte capacitors of Examples 74 to 76, the ESR, the capacitance and the breakdown voltage were measured in the same manner as Example 33. The results are shown in Table 10.

TABLE 10

|  | oxidant and dopant solution | capacitance ($\mu F$) | ESR ($m\Omega$) | breakdown voltage (V) |
| --- | --- | --- | --- | --- |
| Ex. 74 | Ex. 3 | 11.4 | 32.1 | 53 |
| Ex. 75 | Ex. 4 | 11.4 | 31.9 | 54 |
| Ex. 76 | Ex. 7 | 11.5 | 32.1 | 47 |

As shown in Table 10, the winding type aluminum solid electrolyte capacitors of Examples 74 to 76 had a capacitance of 11.4 to 11.8 $\mu F$, satisfying the requirements of the set capacitance of 10 $\mu F$ or more. They had an ESR of 31.9 to 32.1 $m\Omega$, satisfying the set ESR of 40 $m\Omega$ or less. They had a breakdown voltage of 48 to 54V, and were excellent in the voltage resistance.

The winding type aluminum solid electrolyte capacitors of Examples 74 to 76 and Examples 35, 36, 39 were compared, which had been prepared by using the same oxidant and dopant solution. Examples 74 to 76 used the monomer mixture of 3,4-ethylenedioxythiophene and butylated ethylenedioxythiophene to prepare the winding type aluminum solid electrolyte capacitors. The winding type aluminum solid electrolyte capacitors of Examples 74 to 76 were more excellent in the capacitor properties of having high breakdown voltage and low ESR than those of Examples 35, 36 and 39 in which the monomer, 3,4-ethylenedioxythiophene alone was used.

In detail, the winding type aluminum solid electrolyte capacitors of Examples 74 and 35 were prepared by using the same oxidant and dopant solution of Example 3. However, the winding type aluminum solid electrolyte capacitor of Example 35 was prepared by using the monomer, 3,4-ethylenedioxythiophene alone was used. As shown in Table 4, Example 35 had a breakdown voltage of 46V, a capacitance of 11.5 $\mu F$, and an ESR of 34.7 $m\Omega$. By contrast, the winding type aluminum solid electrolyte capacitor of Example 74 was prepared by the monomer mixture of 3,4-ethylenedioxythiophene and butylated ethylenedioxythiophene. As shown in Table 10, the winding type aluminum solid electrolyte capacitor of Example 74 had a breakdown voltage of 53V, a capacitance of 11.4 $\mu F$, and an ESR of 32.1 $m\Omega$. As results, the winding type aluminum solid electrolyte capacitor of Example 74 was more excellent in the capacitor properties of having high breakdown voltage and low ESR than that of Example 35.

The winding type aluminum solid electrolyte capacitors of Examples 75 and 36 were compared, which had been prepared by using the same oxidant and dopant solution of Example 4. The winding type aluminum solid electrolyte capacitor of Example 75 was prepared by using the monomer mixture of 3,4-ethylenedioxythiophene and butylated ethylenedioxythiophene. Example 75 was more excellent in the capacitor properties of having high breakdown voltage and low ESR than that of Example 36 in which the monomer, 3,4-ethylenedioxythiophene alone was used.

The winding type aluminum solid electrolyte capacitors of Examples 76 and 39 were compared, which had been prepared by using the same oxidant and dopant solution of Example 7. The winding type aluminum solid electrolyte capacitor of Example 76 was prepared by using the monomer mixture of 3,4-ethylenedioxythiophene and butylated ethylenedioxythiophene. Example 76 was more excellent in the capacitor properties of having high breakdown voltage and low ESR than that of Example 39 in which the monomer, 3,4-ethylenedioxythiophene alone was used.

Evaluation (7) of Solid Electrolyte Capacitor

In the Evaluation (7) of the solid electrolyte capacitors, the winding type aluminum solid electrolyte capacitors were used, which had been prepared by using the mixtures of the monomers of 3,4-ethylenedioxythiophene, ethylated ethylenedioxythiophene and propylated ethylenedioxythiophene, through the oxidation polymerization with the oxidant and dopant solutions of Examples 3, 4 and 7. Thereby, the capacitor properties were evaluated.

Examples 77 to 79

There is described for the preparation of the winding type aluminum solid electrolyte capacitor of Example 77 by using the oxidant and dopant solution of Example 3. The capacitor elements used in Examples 77 to 79 were the same as that used in e.g., Example 33, requiring the winding type aluminum solid electrolyte capacitors to satisfy the set capacitance of 10 $\mu F$ or more and the set ESR of 40 $m\Omega$ or less.

In detail, 3,4-ethylenedioxythiophene (manufactured by Tayca Corporation; 10ml), ethylated ethylenedioxythiophene (5ml) of Synthesis Example 2, and propylated ethylenedioxythiophene (5ml) of Synthesis Example 3 were mixed. Into the mixture solution, methanol (80 ml) was added to provide a monomer solution, into which a capacitor element was immersed in, and taken out therefrom. Then, it was dried at 50° C. for 10 minutes. Then, the capacitor element was immersed in the oxidant and dopant solution (100 ml) of Example 3, and then, taken out therefrom. Then, it was heated at 70° C. for 2 hours and at 180° C. for one hour to polymerize the monomer. Thereby, a solid electrolyte layer of a conductive polymer was formed, which had a polymer backbone made from the mixture of 3,4-ethylenedioxythiophene, ethylated ethylenedioxythiophene and propylated ethylenedioxythiophene. An exterior package was provided to obtain the winding type aluminum solid electrolyte capacitor of Example 77.

Instead of the oxidant and dopant solution of Example 3, the oxidant and dopant solutions of Examples 4 and 7 were used. Other than that, the same procedures as the use of the oxidant and dopant solution of Example 3 were carried out. The winding type aluminum solid electrolyte capacitors using each of the oxidant and dopant solutions were prepared.

Thereby, the winding type aluminum solid electrolyte capacitors of Examples 78 and 79 were obtained.

As to the winding type aluminum solid electrolyte capacitors of Examples 77 to 79, the ESR, the capacitance and the breakdown voltage were measured in the same manner as Example 33. The results are shown in Table 11.

TABLE 11

|  | oxidant and dopant solution | capacitance (μF) | ESR (mΩ) | breakdown voltage (V) |
|---|---|---|---|---|
| Ex. 77 | Ex. 3 | 11.6 | 30.9 | 57 |
| Ex. 78 | Ex. 4 | 11.6 | 30.2 | 58 |
| Ex. 79 | Ex. 7 | 11.6 | 30.9 | 49 |

As shown in Table 11, the winding type aluminum solid electrolyte capacitors of Examples 77 to 79 had a capacitance of 11.8 μF, satisfying the set capacitance of 10 μF or more. They had an ESR of 30.2 to 30.9 mΩ, satisfying the set ESR of 40 mΩ or less. They had a breakdown voltage of 48 to 54V, and were excellent in the voltage resistance.

The winding type aluminum solid electrolyte capacitors of Examples 77 to 79 and Examples 35, 36 and 39 were compared, which had been prepared by using the same oxidant and dopant solution. Examples 77 to 79 used the monomer mixture of 3,4-ethylenedioxythiophene, ethylated ethylenedioxythiophene, and propylated ethylenedioxythiophene to prepare the winding type aluminum solid electrolyte capacitors. The winding type aluminum solid electrolyte capacitors of Examples 77 to 79 were more excellent in the capacitor properties of having high breakdown voltage, high capacitance and low ESR than those of Examples 35, 36 and 39 in which the monomer, 3,4-ethylenedioxythiophene alone was used.

In detail, the winding type aluminum solid electrolyte capacitors of Examples 77 and 35 used the same oxidant and dopant solution of Example 3. Example 35 used the monomer, 3,4-ethylenedioxythiophene alone to prepare the winding type aluminum solid electrolyte capacitor of Example 35. As shown in Table 4, Example 35 had a breakdown voltage of 46V, a capacitance of 11.8 μF, and an ESR of 34.7 mΩ. By contrast, Example 77 used the monomer mixture of 3,4-ethylenedioxythiophene, ethylated ethylenedioxythiophene, and propylated ethylenedioxythiophene to prepare the winding type aluminum solid electrolyte capacitor. As shown in Table 11, Example 77 had a breakdown voltage of 57V, a capacitance of 11.6 μF, an ESR of 30.9 mΩ. As results, the winding type aluminum solid electrolyte capacitors of Example 77 were more excellent in the capacitor properties of having high breakdown voltage, high capacitance and low ESR than that of Example 35.

The winding type aluminum solid electrolyte capacitors of Examples 78 and 36 were compared, which had been prepared by using the same oxidant and dopant solution of Example 4. Example 78 used the monomer mixture of 3,4-ethylenedioxythiophene, ethylated ethylenedioxythiophene and propylated ethylenedioxythiophene. The winding type aluminum solid electrolyte capacitor of Example 78 was more excellent in the capacitor properties of having high breakdown voltage, high capacitance and low ESR than that of Example 36 in which the monomer, 3,4-ethylenedioxythiophene alone was used.

The winding type aluminum solid electrolyte capacitors of Examples 79 and 39 were compared, which had been prepared by using the same oxidant and dopant solution of Example 7. The winding type aluminum solid electrolyte capacitor of Example 79 was prepared by using the monomer mixture of 3,4-ethylenedioxythiophene, ethylated ethylenedioxythiophene and propylated ethylenedioxythiophene. Example 79 was more excellent in the capacitor properties of having high breakdown voltage, high capacitance and low ESR than that of Example 39 in which the monomer, 3,4-ethylenedioxythiophene alone was used.

Evaluation of Solid Electrolyte Capacitor (8)

In the Evaluation (8) of the solid electrolyte capacitors, the winding type aluminum solid electrolyte capacitors were used, which had been prepared by using the monomer mixture of 3,4-ethylenedioxythiophene, methylated ethylenedioxythiophene, and butylated ethylenedioxythiophene, through the oxidation polymerization with the oxidant and dopant solution of Examples 3, 4 and 7. Then, the capacitor properties were evaluated.

Examples 80 to 82

There is described for the preparation of the winding type aluminum solid electrolyte capacitor of Example 80 using the oxidant and dopant solution of Example 3. The capacitor elements used in Examples 80 to 82 were the same as that used in e.g., Example 33, requiring the winding type aluminum solid electrolyte capacitors to satisfy the set capacitance of 10 μF or more and the set ESR of 40 mΩ or less.

In detail, 3,4-ethylenedioxythiophene (manufactured by Tayca Corporation; 10 ml), methylated ethylenedioxythiophene (5 ml) of Synthesis Example 1, and butylated ethylenedioxythiophene (5 ml) of Synthesis Example 4 were mixed. Into the mixture solution, methanol (80 ml) was added to provide a monomer solution, into which a capacitor element was immersed in, and taken out therefrom. Then, it was dried at 50° C. for 10 minutes. The capacitor element was immersed in the oxidant and dopant solution (100 ml) of Example 3, and then, taken out therefrom. Then, it was heated at 70° C. for 2 hours and at 180° C. for one hour to polymerize the monomer. Thereby, a solid electrolyte layer of a conductive polymer was formed, which had a polymer backbone made of the mixture of 3,4-ethylenedioxythiophene, methylated ethylenedioxythiophene and butylated ethylenedioxythiophene. An exterior package was provided to obtain the winding type aluminum solid electrolyte capacitor of Example 80.

Instead of the oxidant and dopant solution of Example 3, the oxidant and dopant solutions of Examples 4 and 7 were used. Other than that, the same procedures as the use of the oxidant and dopant solution of Example 3 were carried out. The winding type aluminum solid electrolyte capacitors were prepared by using each of the oxidant and dopant solutions. Thereby, the winding type aluminum solid electrolyte capacitors of Examples 81 and 82 were obtained.

As to the winding type aluminum solid electrolyte capacitors of Examples 80 to 82, the ESR, the capacitance and the breakdown voltage were measured in the same manner as Example 33. The results are shown in Table 12.

TABLE 12

|  | oxidant and dopant solution | capacitance (μF) | ESR (mΩ) | breakdown voltage (V) |
|---|---|---|---|---|
| Ex. 80 | Ex. 3 | 11.4 | 32.2 | 54 |
| Ex. 81 | Ex. 4 | 11.3 | 32.1 | 53 |
| Ex. 82 | Ex. 7 | 11.5 | 32.4 | 48 |

As shown in Table 12, the winding type aluminum solid electrolyte capacitors of Examples 80 to 82 had a capacitance of 11.3 to 11.8 μF, satisfying the set capacitance of 10 μF or more. They had an ESR of 32.1 to 32.4 mΩ, satisfying the set ESR of 40 mΩ or less. They had a breakdown voltage of 48 to 54V, and were excellent in the voltage resistance.

The winding type aluminum solid electrolyte capacitors of Examples 80 to 82 and Examples 35, 36 and 39 were compared, which had been prepared by using the same oxidant and dopant solution. Examples 80 to 82 used the monomer mixture of 3,4-ethylenedioxythiophene, methylated ethylenedioxythiophene and butylated ethylenedioxythiophene. The winding type aluminum solid electrolyte capacitors of Examples 80 to 82 were more excellent in the capacitor properties of having high breakdown voltage and low ESR than those of Examples 35, 36 and 39 prepared by using monomer, 3,4-ethylenedioxythiophene alone.

In more detail, the winding type aluminum solid electrolyte capacitors of Examples 80 and 35 used the same oxidant and dopant solution of Example 3. However, Example 35 used the monomer, 3,4-ethylenedioxythiophene alone to prepare the winding type aluminum solid electrolyte capacitor. As shown in Table 4, Example 35 had a breakdown voltage of 46V, a capacitance of 11.8 µF, and an ESR of 34.7 mΩ. By contrast, Example 80 used the monomer mixture of 3,4-ethylenedioxythiophene, methylated ethylenedioxythiophene and butylated ethylenedioxythiophene to prepare the winding type aluminum solid electrolyte capacitor. As shown in Table 12, Examples 80 had a breakdown voltage of 54V, a capacitance of 11.4 µF and an ESR of 32.2 mΩ. As results, the winding type aluminum solid electrolyte capacitor of Example 80 was more excellent in the capacitor properties of having high breakdown voltage and low ESR than that of Example 35.

The winding type aluminum solid electrolyte capacitors of Examples 81 and 36 were compared, which had been prepared by using the same oxidant and dopant solution of Example 4. However, Example 81 used the monomer mixture of 3,4-ethylenedioxythiophene, methylated ethylenedioxythiophene, and butylated ethylenedioxythiophene, whereas Example 36 used the monomer, 3,4-ethylenedioxythiophene alone. The winding type aluminum solid electrolyte capacitor of Example 81 was more excellent in the capacitor properties of having high breakdown voltage and low ESR than that of Example 36.

The winding type aluminum solid electrolyte capacitors of Examples 82 and 39 were compared, which had been prepared by using the same oxidant and dopant solution of Example 7. However, Example 82 used the monomer mixture of 3,4-ethylenedioxythiophene, methylated ethylenedioxythiophene, and butylated ethylenedioxythiophene, whereas Example 39 used the monomer, 3,4-ethylenedioxythiophene alone. The winding type aluminum solid electrolyte capacitors of Example 81 were more excellent in the capacitor properties of having high breakdown voltage and low ESR than that of Example 39.

Oxidant and Dopant Solution; Preparation (3)

Examples 83 to 88 and Comparative Examples 13 to 15

In Examples 83 to 88 and Comparative Examples 10 to 12, ferric p-toluenesulfonate as the organic ferric sulfonate was used. As the glycidyl compound, Examples 83, 84 and 85 used epoxy propanol which is a monoglycidyl compound of Formula (1). Example 86 used polyethylene glycol diglycidyl ether [manufactured by Sakamoto Yakuhin Kogyo co., Ltd.; SR-BEGS (product name); in Formula (3), n is 8, that is, the median value of the polyethylene glycol diglycidyl ether], which is a diglycidyl compound of Formula (3). Example 87 used glycidyl methacrylate. Example 88 used a reaction product of glycidyl methacrylate and butanediol prepared by Preparation Example 1. As the polyalcohol, Examples 83 to 86 used glycerol. Example 87 used butanediol. The oxidant and dopant solution was prepared as follows. Note that in Table 13, there is described for the preparation by using the oxidant and dopant for ferric p-toluenesulfonate to provide the oxidant and dopant solution, with the following abbreviations for the space restriction. The kind and the amount of the glycidyl compound, the content ratio of the glycidyl compound with respect to p-tolueneferric sulfonate, the kind and the amount of polyalcohol, the content ratio of polyalcohol with respect to ferric p-toluenesulfonate are shown as follows. The amount of the glycidyl compound is shown as X. The amount of the glycidyl compound is shown as A(g). The content ratio of the glycidyl compound with respect to ferric p-toluenesulfonate is shown as B(%). The kind of the polyalcohol is shown as Y. The amount of the polyalcohol is shown as C(g). The content ratio of the polyalcohol with respect to ferric p-toluenesulfonate is shown as D(%). The amount of butanol is shown as E(g). The same ways apply to the description for Preparation Method (3) of the Oxidant And Dopant Solution, described below.

Oxidant and Dopant Solution; Preparation Method (3)

40% ferric p-toluenesulfonate butanol solution (iron and p-toluenesulfonic acid were included at a molar ratio of 1:2.74) manufactured by Tayca Corporation was distilled for condensation. The dry solid content was 67.2%. With respect to the solution (100 g), glycidyl compound X (Ag), polyalcohol Y (Cg), and butanol (Eg) were added, and then, heated at 60° C. for one hour. Then, a glass filter GF75 was used for filtration. Each of the filtrates was used as oxidant and dopant solutions of Examples 83 to 88 and Comparative Examples 13 to 15. The solution had, for calculation purpose, a solid content concentration of 45.0%. The oxidant and dopant solutions in Table 13 include the information regarding the content ratio B % of glycidyl compound X with respect to p-tolueneferric sulfonate, and the content ratio D % of polyalcohol Y with respect to p-tolueneferric sulfonate, for each of the Examples and the Comparative Examples. Note that for the space restriction, Table 13 shows the glycidyl compounds and the polyalcohols by abbreviations.

Glycidyl Compounds:
EPPOL: epoxy propanol
PEG-DG: polyethylene glycol diglycidyl ether
Meth-G: glycidyl methacrylate Preparation Example 1

A Reaction Product of Glycidyl Methacrylate and Butanediol

Polyalcohols:
GLYOL: glycerol
BUDOL: butylalcohol

TABLE 13

| | glycidyl compound | | | polyalcohol | | amount of butanol |
|---|---|---|---|---|---|---|
| | | amount | | | amount | |
| | X | A(g) | B(%) | Y | C(g) | D(%) | E(g) |
| Ex. 83 | EPPOL | 1.3 | 2 | GLYOL | 1.3 | 2 | 46.7 |
| Ex. 84 | EPPOL | 3.4 | 5 | GLYOL | 1.3 | 2 | 44.6 |
| Ex. 85 | EPPOL | 6.7 | 10 | GLYOL | 1.3 | 2 | 41.3 |
| Ex. 86 | PEG-DG | 6.7 | 10 | GLYOL | 1.3 | 2 | 41.3 |

TABLE 13-continued

| | glycidyl compound | | | polyalcohol | | amount of butanol E(g) |
|---|---|---|---|---|---|---|
| | X | amount A(g) | B(%) | Y | amount C(g) | D(%) | |
| Ex. 87 | Meth-G | 6.7 | 10 | BUDOL | 1.3 | 2 | 41.3 |
| Ex. 88 | Preparation Ex. 1 | 6.7 | 10 | — | 10 | 0 | 42.6 |
| Comp. Ex. 13 | — | 0 | 0 | — | 0 | 0 | 49.3 |
| Comp. Ex. 14 | — | 0 | 0 | GLYOL | 1.3 | 2 | 48.0 |
| Comp. Ex. 15 | PEG 400 | 6.7 | 10 | GLYOL | 1.3 | 2 | 41.3 |

Evaluation (9) of Solid Electrolyte Capacitors

The Evaluation (9) of the solid electrolyte capacitors, the monomer, 3,4-ethylenedioxythiophene was carried out as follows. The oxidant and dopant solutions of Examples 83 to 88 were used, and the winding type aluminum solid electrolyte capacitors of Examples 89 to 94 were prepared to satisfy the set capacitance of 10 μF or more and the set ESR of 40 mΩ or less. Then, their capacitor properties were compared with those of the winding type aluminum solid electrolyte capacitors of Comparative Examples 16 to 18 which had been prepared by using the oxidant and dopant solutions of Comparative Examples 13 to 15. Then, the properties of the oxidant and dopant solution used in Examples 83 to 88 and Comparative Examples 13 to 15 were evaluated.

Examples 89 to 94 and Comparative Examples 16 to 18

There is described for the preparation of the winding type aluminum solid electrolyte capacitor of Example 89 using the oxidant and dopant solution of Example 83. The capacitor element used in Examples 89 to 94 and Comparative Examples 16 to 18 were the same as that used in e.g., Example 33, requiring the winding type aluminum solid electrolyte capacitors to satisfy the set capacitance of 10 μF or more and the set ESR of 40 mΩ or less.

In more detail, into 3,4-ethylenedioxythiophene (manufactured by Tayca Corporation; 20 ml), methanol (80 ml) was added to provide a monomer solution, into which a capacitor element was immersed in, and taken out therefrom. Then, it was dried at 50° C. for 10 minutes. Then, the capacitor element was immersed in the oxidant and dopant solution (100 ml) of Example 83, and then, taken out therefrom. Then, it was heated at 70° C. for 2 hours and at 180° C. for 1 hour to polymerize the monomer. Thereby, a solid electrolyte layer of a conductive polymer was formed, which had a polymer backbone made from the monomer mixture of 3,4-ethylenedioxythiophene. An exterior package was provided to obtain the winding type aluminum solid electrolyte capacitor of Example 89.

Instead of the oxidant and dopant solution of Example 83, the oxidant and dopant solutions of Examples 84 to 88 and Comparative Examples 13 to 15 were used. Other than that, the same procedures as the use of the oxidant and dopant solution of Example 83 were carried out. The winding type aluminum solid electrolyte capacitors using each of the oxidant and dopant solutions were prepared. Thereby, the winding type aluminum solid electrolyte capacitors of Examples 90 to 94 and Comparative Examples 16 to 18 were obtained.

As to the winding type aluminum solid electrolyte capacitors of Examples 89 to 94 and Comparative Examples 16 to 18, the ESR and the capacitance were measured. Also, the leak current was measured to inspect the generation of the defects due to the leak current. The results are shown in Table 14. In measuring the ESR and the capacitance, an LCR Meter (4284A) manufactured by Hewlett Packard Corporation, at a condition of 25° C. The ESR was measured at 100 kHz. The capacitance was measured at 120 Hz. There is described for the measuring method for the leak current and the evaluation method for the generation of the defects due to leak current.

Leak Current:

To a winding type aluminum solid electrolyte capacitor, a rated voltage of 16V was applied at a condition of 25° C. for 60 seconds, and then, the leak current was measured by using a digital oscilloscope.

Generation of the Defects Due to Leak Current:

In the same manner as the leak current above, the leak current is first measured, and when the leak current is 100 μA or more, it is determined and evaluated that there occurs the defects due to leak current.

For each Example, 50 samples were measured. The values in Table 14 are the results of averaging of the 50 samples with rounding to one decimal place. For the results of the generation of the defects due to leak current, the total numbers of the capacitors are shown in the denominator, and the numbers of the finding of the generation of the defects due to leak current is shown in the numerator. They are shown in the Table in the column of "Numbers of the generation of the defects due to leak current."

TABLE 14

| | oxidant and dopant solution | Capacitance (μF) | ESR (mΩ) | Numbers of the generation of the defects due to leak current (pieces) |
|---|---|---|---|---|
| Ex. 89 | Ex. 83 | 11.2 | 32.4 | 2/50 |
| Ex. 90 | Ex. 84 | 11.3 | 31.9 | 0/50 |
| Ex. 91 | Ex. 85 | 11.3 | 31.1 | 0/50 |
| Ex. 92 | Ex. 86 | 11.2 | 31.5 | 0/50 |
| Ex. 93 | Ex. 87 | 11.3 | 32.1 | 0/50 |
| Ex. 94 | Ex. 88 | 11.5 | 31.7 | 0/50 |
| Comp. Ex. 16 | Comp. Ex. 13 | 11.5 | 35.4 | 13/50 |
| Comp. Ex. 17 | Comp. Ex. 14 | 11.4 | 32.9 | 10/50 |
| Comp. Ex. 18 | Comp. Ex. 15 | 11.5 | 32.4 | 11/50 |

As shown in Table 14, the winding type aluminum solid electrolyte capacitors of Examples 89 to 94 and Comparative Examples 16 to 18 had a capacitance in the level of 11 μF, satisfying the set capacitance of 10 μF or more. They had an ESR in the level of 30 mΩ, satisfying the set ESR of 40 mΩ or less. Furthermore, the winding type aluminum solid electrolyte capacitors of Examples 89 to 94 seldom generated the defects due to leak current, or even if it did, the numbers of the generation were smaller than those in the winding type aluminum solid electrolyte capacitors of Comparative Examples 16 to 18.

INDUSTRIAL APPLICABILITY

According to the present invention, there is provided a solid electrolyte capacitor with low ESR and high capacitance, having improved voltage resistance. According to the present invention, there is provided a solid electrolyte capacitor which is less likely to generate the defects due to leak current.

What is claimed is:

1. An oxidant and dopant solution for conductive polymer production, comprising:
   an organic ferric sulfonate serving as an oxidant and dopant for conductive polymer production; and
   an alcohol having a carbon number of 1 to 4,
   wherein the oxidant and dopant solution further comprises a glycidyl-group-containing compound or a ring-opened compound thereof,
   wherein the glycidyl-group-containing compound or the ring-opened compound is at least one selected from the group consisting of a monoglycidyl compound represented by Formula (1), a diglycidyl compound represented by Formula (2), a diglycidyl compound represented by Formula (3), glycerol triglycidyl ether, diglycerol tetraglycidyl ether, glycidyl methacrylate, phenyl glycidyl ether and cresyl glycidyl ether, and a ring-opened compound thereof;
   Formula (1):

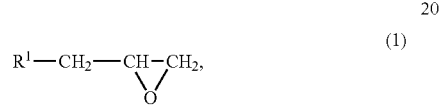

wherein the formula (1), $R^1$ is hydroxyl group, alkyl group with a carbon number of 1 to 5, and alkoxyl group with a carbon number of 1 to 7, Formula (2):

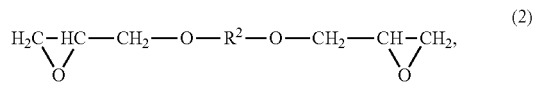

wherein the formula (2), $R^2$ is alkylene with a carbon number of 2 to 6, Formula (3):

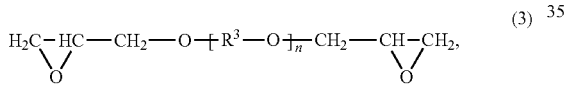

wherein the formula (3), $R^3$ is alkylene with a carbon number of 2 to 4, and n is 2 to 20.

2. The oxidant and dopant solution for conductive polymer production according to claim 1, wherein the glycidyl-group-containing compound or the ring-opened compound is added at an amount of 2 to 40% by mass standard with respect to the organic ferric sulfonate.

3. The oxidant and dopant solution for conductive polymer production according to claim 1, wherein the glycidyl-group-containing compound or the ring-opened compound is added at an amount of 10 to 40% by mass standard with respect to the organic ferric sulfonate.

4. The oxidant and dopant solution for conductive polymer production according to claim 1, further comprising a polyalcohol.

5. The oxidant and dopant solution for conductive polymer production according to claim 4, wherein the polyalcohol includes an aliphatic hydrocarbon with a carbon number of 2 to 10, having 2 to 3 hydroxyl groups.

6. The oxidant and dopant solution for conductive polymer production according to claim 4, wherein the polyalcohol is added at an amount of 20% or less by mass standard with respect to the organic ferric sulfonate.

7. The oxidant and dopant solution for conductive polymer production according to claim 1, wherein the organic ferric sulfonate is ferric p-toluenesulfonate or methoxybenzeneferric sulfonate.

8. A conductive polymer prepared by using the oxidant and dopant solution for conductive polymer production according to claim 1, wherein the conductive polymer is made from a thiophene or its derivative through an oxidation polymerization.

9. The conductive polymer of claim 8, wherein the derivative of the thiophene is 3,4-ethylenedioxy thiophene.

10. The conductive polymer of claim 8, wherein the derivative of the thiophene is a mixture of 3,4-ethylenedioxy thiophene with at least one alkylated ethylenedioxy thiophene selected from the group consisting of methylated ethylenedioxy thiophene, ethylated ethylenedioxy thiophene, propylated ethylenedioxy thiophene and butylated ethylenedioxy thiophene.

11. A solid electrolyte capacitor, comprising:
   the conductive polymer according to claim 8 as a solid electrolyte.

12. A method for producing a solid electrolyte capacitor, comprising:
   providing the oxidant and dopant solution for conductive polymer production according to claim 1;
   preparing a conductive polymer through an oxidation polymerization of a thiophene or its derivative by using the oxidant and dopant solution;
   providing the conductive polymer as a solid electrolyte; and
   obtaining a solid electrolyte capacitor.

13. The method for producing a solid electrolyte capacitor according to claim 12, wherein the oxidant and dopant solution for conductive polymer production is prepared in a production process of the solid electrolyte capacitor, comprising:
   adding the glycidyl-group-containing compound or the ring-opened compound thereof, into an alcohol solution, wherein the alcohol solution comprises the organic ferric sulfonate and an alcohol with a carbon number of 1 to 4; or
   adding the glycidyl-group-containing compound or the ring-opened compound thereof, and the polyalcohol, into an alcohol solution, wherein the alcohol solution comprises the organic ferric sulfonate and an alcohol with a carbon number of 1 to 4.

14. An oxidant and dopant solution for conductive polymer production, comprising:
   an organic ferric sulfonate serving as an oxidant and dopant for conductive polymer production;
   an alcohol having a carbon number of 1 to 4, and
   a polyalcohol
   wherein the oxidant and dopant solution further comprises a glycidyl-group-containing compound or a ring-opened compound thereof,
   wherein the polyalcohol is added at an amount of 20% or less by mass standard with respect to the organic ferric sulfonate.

15. The oxidant and dopant solution for conductive polymer production according to claim 14, wherein the polyalcohol is added at an amount from 4% by mass to 20% by mass standard with respect to the organic ferric sulfonate.

16. The oxidant and dopant solution for conductive polymer production according to claim 15, wherein the glycidyl-group-containing compound or the ring-opened compound is at least one selected from the group consisting of a monoglycidyl compound represented by Formula (1), a diglycidyl compound represented by Formula (2), a diglycidyl compound represented by Formula (3), glycerol triglycidyl ether, diglycerol tetraglycidyl ether, glycidyl methacrylate, phenyl glycidyl ether and cresyl glycidyl ether, and a ring-opened compound thereof;

Formula (1):
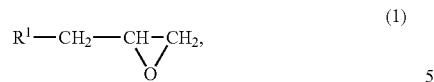
(1)
wherein the formula (1), $R^1$ is hydroxyl group, alkyl group with a carbon number of 1 to 5, and alkoxyl group with a carbon number of 1 to 7,
Formula (2):
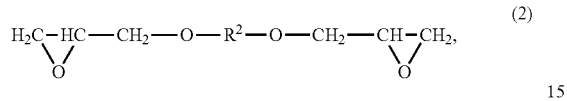
(2)
wherein the formula (2), $R^2$ is alkylene with a carbon number of 2 to 6,
Formula (3):
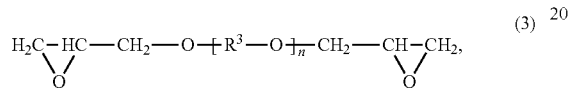
(3)
wherein the formula (3), $R^3$ is alkylene with a carbon number of 2 to 4, and n is 2 to 20.
* * * * *